United States Patent
Santos-Villalobos et al.

(10) Patent No.: US 10,387,724 B2
(45) Date of Patent: Aug. 20, 2019

(54) IRIS RECOGNITION VIA PLENOPTIC IMAGING

(71) Applicant: UT-Battelle, LLC, Oak Ridge, TN (US)

(72) Inventors: Hector J. Santos-Villalobos, Knoxville, TN (US); Chris Bensing Boehnen, Knoxville, TN (US); David S. Bolme, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 56 days.

(21) Appl. No.: 15/721,306

(22) Filed: Sep. 29, 2017

(65) Prior Publication Data

US 2018/0025206 A1    Jan. 25, 2018

Related U.S. Application Data

(62) Division of application No. 14/710,427, filed on May 12, 2015, now Pat. No. 9,811,729.

(51) Int. Cl.
*G06K 9/00* (2006.01)
*G06T 5/00* (2006.01)
*G06T 5/50* (2006.01)

(52) U.S. Cl.
CPC ....... *G06K 9/0061* (2013.01); *G06K 9/00604* (2013.01); *G06T 5/003* (2013.01);
(Continued)

(58) Field of Classification Search
CPC .......... G06K 9/00597–00617; G06K 9/00604; G06T 5/50; G06T 5/003;
(Continued)

(56) References Cited

U.S. PATENT DOCUMENTS 4,641,349 A    2/1987    Flom et al.
6,714,665 B1   3/2004    Hanna et al.
(Continued)

FOREIGN PATENT DOCUMENTS

KR    1020110078468 A    7/2011

OTHER PUBLICATIONS

Tankasala et al., "A video-based hyper-focal imaging method for iris recognition in the visible spectrum," Homeland Security (HST), 2012, IEEE Conference on Technologies for, IEEE, 2012, 6 pages.
(Continued)

*Primary Examiner* — Aaron W Carter
(74) *Attorney, Agent, or Firm* — Klarquist Sparkman LLP

(57) ABSTRACT

Iris recognition can be accomplished for a wide variety of eye images by using plenoptic imaging. Using plenoptic technology, it is possible to correct focus after image acquisition. One example technology reconstructs images having different focus depths and stitches them together, resulting in a fully focused image, even in an off-angle gaze scenario. Another example technology determines three-dimensional data for an eye and incorporates it into an eye model used for iris recognition processing. Another example technology detects contact lenses. Application of the technologies can result in improved iris recognition under a wide variety of scenarios.

7 Claims, 26 Drawing Sheets

(52) U.S. Cl.
CPC ............ *G06T 5/50* (2013.01); *G06T 2200/21* (2013.01); *G06T 2207/10052* (2013.01); *G06T 2207/30041* (2013.01)

(58) Field of Classification Search
CPC . G06T 2207/30041; G06T 2207/10052; G06T 2200/21
See application file for complete search history.

(56) References Cited

U.S. PATENT DOCUMENTS

| | | | |
|---|---|---|---|
| 7,433,804 | B2 | 10/2008 | Marschner et al. |
| 8,050,463 | B2 | 11/2011 | Hamza |
| 8,098,901 | B2 | 1/2012 | Hamza |
| 8,144,208 | B2 | 3/2012 | Silveira et al. |
| 8,824,779 | B1 | 9/2014 | Smyth |
| 8,958,608 | B2 | 2/2015 | Santos-Villalobos et al. |
| 9,811,729 | B2* | 11/2017 | Santos-Villalobos ........................ G06K 9/0061 |
| 9,934,436 | B2* | 4/2018 | Mears ................. G06K 9/00604 |
| 2008/0075334 | A1 | 3/2008 | Determan et al. |
| 2010/0074477 | A1* | 3/2010 | Fujii .................. G06K 9/00604 382/117 |
| 2012/0140992 | A1 | 6/2012 | Du et al. |
| 2013/0286778 | A1* | 10/2013 | Kisner ................... G01N 29/00 367/35 |
| 2014/0355841 | A1 | 12/2014 | Santos-Villalobos |
| 2015/0347841 | A1* | 12/2015 | Mears ................. G06K 9/00604 348/46 |
| 2016/0335474 | A1 | 11/2016 | Santos-Villalobos et al. |
| 2017/0082858 | A1* | 3/2017 | Klug .................. G02B 27/0172 |
| 2017/0091550 | A1* | 3/2017 | Feng .................. G06K 9/00597 |
| 2018/0025206 | A1* | 1/2018 | Santos-Villalobos ........................ G06K 9/0061 382/117 |
| 2018/0025207 | A1* | 1/2018 | Santos-Villalobos ........................ G06K 9/0061 382/117 |
| 2018/0173303 | A1* | 6/2018 | Liu .................... G02B 27/0025 |

OTHER PUBLICATIONS

Kodama et al., "Efficient reconstruction of all-in-focus images through shifted pinholes from multi-focus images for dense light field synthesis and rendering," IEEE Transactions on Image Processing 22.11 (2013), pp. 4407-4421.
Hariharah, "Extending Depth of Field via Multifocus Fusion," 2011, 178 pages.
Marcon et al., "Sclera Segmentation for Gaze Estimation and Iris Localization in Unconstrained Images," *Computational Modeling of Objects Represented in Images: Fundamentals, Methods and Applications III*, Aug. 28, 2012, pp. 25-30.
Bishop et al., "Plenoptic Depth Estimation from Multiple Aliased Views," *IEEE 12th International Conference on Computer Vision Workshops*, pp. 1622-1629 (2009).
Goergiev et al., "Using Focused Plenoptic Cameras for Rich Image Capture," *IEEE Computer Graphics and Applications*, 31(1), pp. 62-73 (2011).
Lumnsdaine et al., "The Focused Plenoptic Camera," IEEE Int. Conf. on computational Photography, pp. 1-8 (2009).
Narayanswamy et al., "Extending the Imaging Volume for Biometric Iris Recognition," *Applied Optics*, 44(5), pp. 701-712 (2005).
Ng et al., "Light-Field Photography with a hand-held plenoptic camera," tech. report. CTSR 2005-02, Stanford University (2005), 11 pages.
Scharstein et al., "A Taxonomy and Evaluation of Dense Two-Frame Stereo Correspondence Algorithms," *Int. Journal of Computer Vision*, 47(1-3), pp. 7-42 (2002).
Seitz et al., "A Comparison and Evaluation of Multi-View Stereo Reconstruction," *IEEE CVPR* 2006, pp. 519-528 (2006).
Thompson, "Simulation and Analysis of the Impact of Eye Morphology on Iris Recognition," Dissertation University of Notre Dame, Indiana, Jul. 2014, 130 pages.
Zhang et al., "Shape from Shading: A Survey," *IEEE Transactions on Pattern Analysis and Machine Intelligence*, vol. 21, No. 8, Aug. 1999, 17 pages.
"About the Technology," NeoFilter Labs, Technology Discussion, visited Mar. 26, 2013, 1 page.
"All About Aspheric Lenses," Edmund Optics Inc. website Learning & Support, visited May 2, 2013, 5 pages.
"Iris Scan," *Wikipedia*, visited Mar. 24, 2013, 11 pages.
"About us," Fulcrum Biometrics, visited Mar. 12, 2013, 1 page.
Almedia et al., "Different Schematic Eyes and Their Accuracy to the In Vivo Eye: A Quantitative Comparison Study," *Brazilian Journal of Physics*, 37(2a) 2007, pp. 378-387.
Bolme et al., "PyVision—Computer Vision Toolkit," http://pyvision.sourceforge.net, 2008, 3 pages.
Bonney et al., "Iris Pattern Extraction Using Bit Planes and Standard Deviations," In *Signals, Systems and Computers, 2004, Conference Record of the Thirty-Eighth Asilomar Conference on*, vol. 1, IEEE, Nov. 2004, pp. 582-586.
Bowyer et al., "Image Understanding for Iris Biometrics: A Survey," *Computer Vision and Image Understanding*, 110(2) 2008, pp. 281-307.
Buck, Download Tree for "POV-Ray—The persistence of vision raytracer," http://www.povray.org/, visited Jan. 24, 2014, showing Aug. 2009 date for version 3.6, 1 page.
Buck, "What's new in POV-Ray 3.6," http://www.povray.org/, Aug. 2009, 2 pages.
Buck, POV-Ray, version 3.6 "Download" page, http://www.povray.org/, Aug. 2009, 2 pages.
Chou et al., "Non-Orthogonal View Iris Recognition System," *Circuits and Systems for Video Technology, IEEE Transactions on*, 20(3) Mar. 2010, pp. 417-430.
Daugman, "High Confidence Visual Recognition of Persons by a Test of Statistical Independence," *Pattern Analysis and Machine Intelligence, IEEE Transactions on*, 15(11), Nov. 1993, pp. 1148-1161.
Daugman, "How Iris Recognition Works," *Circuits and Systems for Video Technology, IEEE Transactions on*, 14(1), Jan. 30, 2004, pp. 21-30.
Daugman, "New Methods in Iris Recognition," *Systems, Man, and Cybernetics, Part B: Cybermetrics, IEEE Transactions on*, 37(5), Oct. 2007, pp. 1167-1175.
Daugman, "Probing the Uniqueness and Randomness of Iriscodes: Results From 200 Billion Iris Pair Comparisons," *Proceedings of the IEEE*, 94(11), Nov. 2006, pp. 1927-1935.
Fitzgibbon et al., "Direct Least Square Fitting of Ellipses," *IEEE Transactions on Pattern Analysis and Machine Intelligence, IEEE Transactions on*, 21(5) May 1999, pp. 476-480.
Francois et al., "Image-Based Modeling of the Human Eye," *Visualization and Computer Graphics, IEEE Transactions on*, 15(5), Sep. 2009, pp. 815-827.
Frigerio et al., "Correction Method for Nonideal Iris Recognition," *19th IEEE International Conference on Image Processing (ICIP)*, Sep. 30-Oct. 3, 2012, pp. 1149-1152.
Le Grand, "Form and Space Vision," Book review, Indiana University Press, 1967, 1 page.
Grother et al., "IREX III: Performance of iris identification algorithms," 2012, 103 pages.
Hashemi et al., "Changes in Corneal Thickness, Curvature, and Anterior Chamber Depth During the Menstrual Cycle," *Canadian Journal of Ophthalmology/Journal Canadien d'Ophtalmologie*, 45(1), 2010, pp. 67-70.
Hu et al., "Iterative Directional Ray-based Iris Segmentation for Challenging Periocular Images," *Biometric Recognition*, Springer Berlin Heidelberg, 2011, 9 pages.
I Scan 2, Dual Iris Capture Scanner, CrossMatch Technologies brochure, Jan. 2012, 1 page.
IriShield—Superior iris recognition in a secure chip, Iritech, Inc., Oct. 2012, 7 pages.
Karakaya et al., "Gaze estimation for off-angle iris recognition based on the biometric eye model," Proc. of SPIE, vol. 8712,

(56) References Cited

OTHER PUBLICATIONS

Biometric and Surveillance Technology for Human and Activity Identification X, 87120F, May 31, 2013, 9 pages.
Kennell et al., "Preprocessing of Off-Axis Iris Images for Recognition," In *SPIE Europe Security and Defence*, International Society for Optics and Photonics, 2008, p. 711906, 9 pages.
Krichen et al., "Osiris (open source for iris) reference system," BioSecure Project, http://www.biosecure.info, 2008, 25 pages.
Li et al., "Iris recognition in non-ideal imaging conditions," *Pattern Recognition Letters*, 33(8), Jun. 2012, pp. 1012-1018.
Liou et al., "Anatomically Accurate, Finite Model Eye for Optical Modeling," *J. Opt. Soc. Am. A.*, 14(8), Aug. 1997, pp. 1684-1695.
Matey et al., "Iris on the Move: Acquisition of Images for Iris Recognition in Less Constrained Environments," *Proceedings of the IEEE*, 94(11), Nov. 2006, pp. 1936-1947.
Mei et al., "Novel Approaches to Improve Robustness, Accuracy and Rapidity of Iris Recognition Systems," *Industrial Informatics, IEEE Transactions on*, 8(1), Feb. 2012, pp. 110-117.
Navarro et al., "Optics of the Average Normal Cornea From General and Canonical Representations of its Surface Topography," *J. Opt. Soc. Am. A.*, 23(2), Feb. 2006, pp. 219-232.
NEUROtechnology, Core Technology for Your Application, Feb. 5, 2013, 12 pages.
NEUROtechnology, Iris Identification for PC and Web solutions, Apr. 23, 2012, 18 pages.
Price et al., "On the Efficacy of Correcting for Refractive Effect in Iris Recognition," Computer Visions and Pattern Recognition, Jun. 2007, CVPR '07, IEEE Conference on, pp. 1-6.
Proenca et al., "Toward Noncooperative Iris Recognition: A Classification Approach Using Multiple Signatures," *Pattern Analysis and Machine Intelligence, IEEE Transactions on*, 29(4), Apr. 2007, pp. 607-612.
Pundlik et al., "Non-Ideal Iris Segmentation Using Graph Cuts," In *Computer, Vision and Pattern Recognition Workshops, 2008, CVPRW '08, IEEE Computer Society Conference on*, Jun. 2008, pp. 1-6.
Rahulkar et al., "Half-Iris Feature Extraction and Recognition Using a New Class of Biorthogonal Triplet Half-Brand Filter and Flexible k-out-of-n: A Postclassifier," *Information Forensics and Security, IEEE Transactions on*, 7(1), Feb. 2012, pp. 230-240.
Ryan et al., "Adapting Starburst for Elliptical Iris Segmentation," *Biometrics: Theory, Applications and Systems, 2008 BTAS, 2IEEE International Conference on*, IEEE 2008, 7 pages.
Santos-Villalobos et al., "ORNL Biometric Eye Model for Iris Recognition," *2012 Fifth IEEE International Conference on Biometrics: Theory Applications and Systems (BTAS)*, Sep. 26, 2012, pp. 176-182, 7 pages.
Sanz et al., "Off-Axis Aberrations of a Wide-Angle Schematic Eye Model," *J. Opt. Soc. Am. A*. 16(8) Aug. 1999, pp. 1881-1891.
Schuckers et al., "On Techniques for Angle Compensation in Nonideal Iris Recognition," *Systems, Man and Cybernetics, Part B: Cybernetics, IEEE Transactions on*, 37(5) Oct. 2007, pp. 1176-1190.
VeriEye eye iris identification technology, algorithm and SDK for PC and Web. 5—Brochure, May 10, 2013, 18 pages.
Vurgese et al., "Scleral Thickness in Human Eyes," *PloS one*, 7(1):e29692, Jan. 2012, 9 pages.
Wecker et al., "A Multiresolution Approach to Iris Synthesis," *Computers and Graphics*, 34(4), 2010, pp. 468-478.
Whitley et al., "Genitor II: A Distributed Genetic Algorithm," *Journal of Experimental and Theoretical Artificial Intelligence*, 1990, vol. 2, No. 3, pp. 189-214.
Woodard et al., "On the Fusion of Periocular and Iris Biometrics in Non-Ideal Imagery," In *Pattern Recognition (ICPR), 2010 20th Proceedings International Conference on*, Aug. 2010, pp. 201-204.
Zhou et al., "Transforming Traditional Iris Recognition Systems to Work on Non-Ideal Situations," In *Industrial Electronics, IEEE Transaction on* 56(8), 2009, pp. 3203-3213.
Zuo et al., "A Robust Iris Segmentation Procedure for Unconstrained Subject Presentation," In *Biometric Consortium Conference, 2006 Biometrics Symposium: Special Session on Research at the*, 2006, pp. 1-6.
Zuo et al., "On a Methodology for Robust Segmentation of Nonideal Iris Images," *Systems, Man and Cybernetics, Part B: Cybernetics, IEEE Transactions on*, 40(3), Jun. 2010, pp. 703-718.
Thompson et al., "Effects of Iris Surface Curvature on Iris Recognition," Conference on Biometrics: Theory, Applications and Systems (BTAS), Sep. 29-Oct. 2, 2013, Washington, DC, 8 pages.
Lytro—ILLUM, lytor.com website, visited Apr. 14, 2015, 7 pages.
Raja et al., "Robust Iris Recognition Using Light-Field Camera," *Colour and Visual Computing Symposium (CVCS)*, 2013, Gjovik, Sep. 5, 2013, 6 pages.
Oak Ridge National Laboratory, "Extraction of Additional Information by Combining Iris and Plenoptic Imaging," at least as early as Aug. 29, 2014, 1 page.
Thompson et al., "Off-Angle Iris Correction using a Biological Model," BTAS 2013, Oct. 1, 2013, 8 pages.
Raghavendra et al., "Combining Iris and Periocular Recognition using Light Field Camera," IAPR Asian Conference on Pattern Recognition, Nov. 8, 2013, 5 pages.
hVI Raytrix 3D Light Field camera, gviglobal.com, visited Feb. 5, 2014, 5 pages.
"Iris Recognition," Wikipedia, visited Feb. 5, 2014, 5 pages.
"Light-field camera," *Wikipedia*, visited Feb. 7, 2014, 3 pages.
Thompson et al., "A Segmentation Perturbation Method for Improved Iris Recognition," *Fourth IEEE International Conference on Biometrics: Theory Applications and Systems* (BTAS) 2010, 8 pages.
Karakaya et al., "Limbus Impact on Off-Angle Iris Degradation," *Biometrics (ICB), 2013 International Conference on. IEEE*, 2013, 6 pages.

\* cited by examiner

IRIS RECOGNITION VIA PLENOPTIC IMAGING

CROSS REFERENCE TO RELATED APPLICATIONS

This is a divisional of co-pending U.S. patent application Ser. No. 14/710,427, filed May 12, 2015, which is hereby incorporated by reference.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

The field relates to technologies for improved iris recognition.

BACKGROUND

Iris recognition is an effective way to identify a person conclusively. For example, a camera can take an image of a person's iris and match it against a gallery of irises associated with known individuals. Such identification techniques can be helpful in a wide variety of security and other applications.

Iris recognition works well in ideal conditions; however, problems arise if the images are less than ideal. For example, if an image is taken from an off-angle perspective, conventional recognizers have difficulty. In practice, such images can be common, so iris recognition technology is hampered by such limitations.

Another challenge to ideal conditions is associated with out-of-focus images.

Still another problem is that contact lenses can interfere with the recognition process.

Thus, although current iris recognition technologies can provide useful functionality, there is room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method implemented at least in part by a computing system, the method comprising: receiving a plenoptic off-angle iris image depicting an iris with an off-angle gaze; from the plenoptic off-angle iris image depicting an iris with an off-angle gaze, creating a plurality of reconstructed images at different synthetic focal depths, wherein the plurality of reconstructed images comprise different in-focus regions of the iris; and stitching together the different in-focus regions of the iris from the plurality of reconstructed images, wherein the stitching generates a fully focused image of the iris.

An embodiment can be a method implemented at least in part by a computing system, the method comprising: receiving a plenoptic iris image depicting an iris; from the plenoptic iris image depicting an iris, determining a three-dimensional shape of the iris; storing the three-dimensional shape of the iris; and applying the three-dimensional shape of the iris as part of iris recognition processing.

An embodiment can be a method implemented at least in part by a computing system, the method comprising: receiving a plenoptic iris image depicting an apparent iris; from the plenoptic iris image depicting an apparent iris, computing a geometric shape of the apparent iris; storing the geometric shape of the apparent iris; comparing the geometric shape of the apparent iris against one or more characteristics of a contact lens; and responsive to determining that the geometric shape of the apparent iris matches the one or more characteristics of the contact lens, sending a message to an iris recognition system indicating that an apparent iris in the plenoptic iris image is covered by a contact lens As described herein, a variety of other features and advantages can be incorporated into the technologies as desired.

DETAILED DESCRIPTION

Example 1—Example Overview

The technologies described herein can be used for improved iris recognition, such as in scenarios involving images having an off-angle gaze. Adoption of the technologies can provide greatly improved recognition, even under less than ideal conditions.

Other aspects relate to three-dimensional eye modeling. A personalized eye model can be developed via three-dimensional feature extraction. Other aspects relate to contact lens detection.

The technologies can be helpful for those wishing to improve existing systems by leveraging existing iris image galleries. For example, the technologies can serve as a preprocessor for conventional iris recognition software.

The three-dimensional modeling technologies can implement a personalized eye model to improve iris recognition.

The contact lens detection technologies can be used to detect the presence of obfuscating contact lenses, including those that potentially interfere with iris recognition technologies.

Beneficiaries include iris recognition technologists who wish to improve recognition performance under real world conditions. End users also benefit from the technologies because they can enjoy better recognition performance.

Many of the technologies described herein can be used in conjunction with conventional iris recognition technologies, images, and hardware with minimal or no modification. Thus, current images and recognition techniques can be used without having to retool underlying software systems.

Example 2—Example System Generating Fully Focused Image of an Iris

Figure 1:
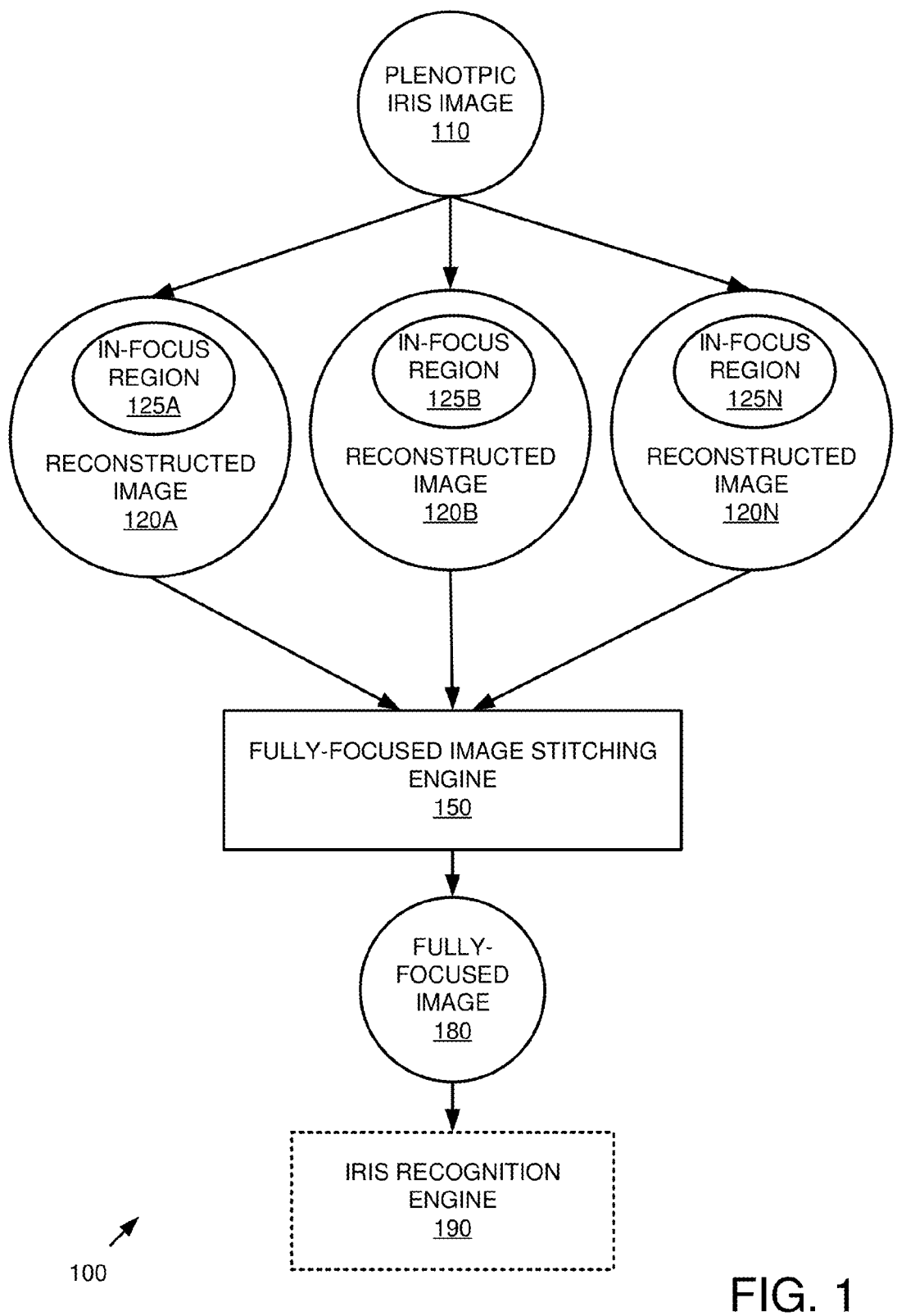
FIG. 1 is a block diagram of an example system generating a fully focused image of an iris from an incoming plenoptic off-angle iris image.

FIG. 1 is a block diagram of an example system 100 generating a fully focused image 180 of an iris from an incoming plenoptic off-angle iris image 110 as described herein. For purposes of context, an iris recognition engine 190 is shown. In the example, a fully focused image stitching engine 150 accepts an incoming set of reconstructed images 120A-N and generates a fully focused image 180.

As described herein, the incoming plenoptic off-angle iris image 110 can depict (e.g., capture a scene including) an iris with an off-angle gaze. In practice, other parts of the eye are typically included. The reconstructed images 120A-N can depict the same iris at different synthetic focus planes.

Different synthetic focus settings can be chosen for the different reconstructed images 120A-N so that different, respective in-focus regions 125A-N are in focus. Due to the off-angle gaze of the iris, the focus settings typically specify a synthetic focus plane that progresses away or toward the capture point while moving across the eye.

A reconstructed image 120A can thus be generated from the plenoptic iris image 110 by applying the synthetic focus plane to the plenoptic iris image 110. In practice, thresholds can be set to determine how many reconstructed images are appropriate, or a fixed number can be used. The shape of the reconstructed images can be blocks, strips, or other geometric shapes that are typically adjacent to cover the entire iris.

A fully focused image stitching engine 150 can be configured to accept the plurality of reconstructed images 120A-N (e.g., at different synthetic focus depths) of an iris with an off-angle gaze and output the fully focused image 180. The engine 150 can stitch together different in-focus regions 125A-N of the iris from the plurality of reconstructed images 120A-N.

The fully focused image 180 can then be used as part of iris recognition processing done by an iris recognition engine 190.

As part of processing, transforming, masking, machine learning, or other techniques can be applied to the images to account for the off-angle gaze as described in U.S. Pat. No. 8,958,608 to Santos-Villalobos et al., which is hereby incorporated herein by reference. For example, a reconstructed frontal view can be generated for purposes of recognition. Such a reconstructed frontal view process can take the fully focused image as input.

The system 100 can be described as a single, unified system, or one or more client systems and one or more server systems. For example, the stitching engine 150 and iris recognition engine 190 can be considered a single system or be provided separately by different vendors or parties (e.g., the stitching engine 150 can be a plug-in or preprocessor for the iris recognition engine 190).

In practice, the systems shown herein, such as system 100 can vary in complexity, with different functionality, components of differing complexity, and the like. For example, additional preprocessing or post-processing can be performed on the images 110, 120A-N, 180. Additional functionality related to iris recognition (e.g., security, biometrics, or the like) can also be incorporated.

The system 100 and any of the other systems described herein can be implemented in conjunction with any of the hardware components described herein, such as the computing systems described below (e.g., one or more hardware processing units, computer-readable memory coupled to the processing units, and the like). In any of the examples herein, the inputs, outputs, images, regions, models, and engines can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a local application without concern over the actual computing infrastructure needed or used to operate the servers, which can be administered by a business entity different from the client user organization.

Example 3—Example Method Generating Fully Focused Image

Figure 2:
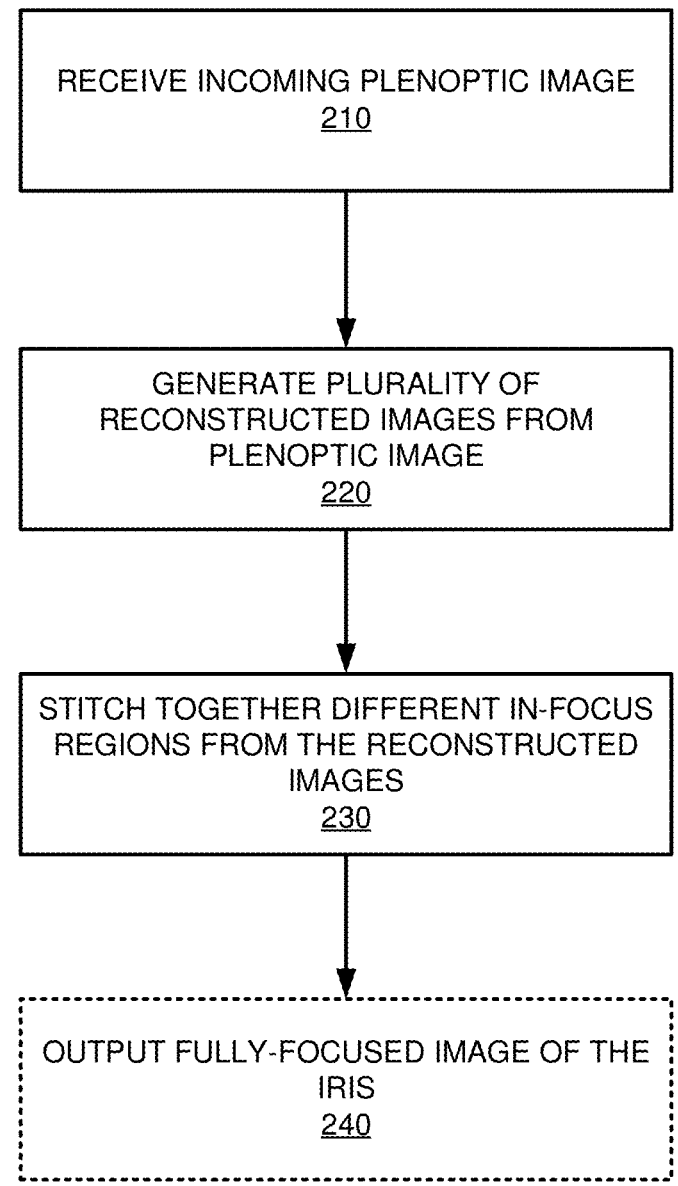
FIG. 2 is a flowchart of an example method of generating a fully focused image of an iris from an incoming plenoptic off-angle iris image.

FIG. 2 is a flowchart of an example method 200 of generating a fully focused image of an iris from an incoming plenoptic off-angle iris image and can be implemented, for example, in the system shown in FIG. 1.

At 210, an incoming off-angle iris plenoptic image depicting an iris with an off-angle gaze is received. For example, a plenoptic camera can be used to capture a plenoptic image of a subject's eye.

At 220, from the off-angle iris image, a plurality of reconstructed images are generated from the plenoptic image. As described herein, a variety of techniques can be used to generate the reconstructed images so that they comprise different in-focus regions of the iris. For example, the reconstructed images can be at different synthetic focus depths. As described herein, the reconstructing can account for the off-angle gaze so that the reconstructed images comprise in-focus regions covering the entire iris.

An iris correlation filter can be applied to reconstruct images at different planes to identify the iris object within respective of the planes. Sharpness can then be measured for the planes (e.g., via an edge filter such as a Sobel edge detector operator or the like). If the iris is in focus for a given plane, the sharpness measurement is high (e.g., relative to other planes or exceeding a threshold), while for out-of-focus, the sharpness measurement is low. The iris regions with the highest sharpness or those exceeding a threshold can be selected for stitching.

Accordingly, the incoming image can be divided into overall regions, and in-focus regions of reconstructed images (e.g., from the reconstructed planar image for which the region is in focus) can be chosen based on the overall regions as described herein.

At 230, a fully focused image of the iris is generated. Such generation can comprise stitching together the different in-focus regions from respective of the reconstructed images.

In practice, the reconstructed image is then used for iris recognition purposes. At 240, the fully focused image of the iris is output. The image can then be used for iris recognition purposes (e.g., submitted to an iris recognizer or iris recognition software for iris recognition processing) as described herein. Techniques such as transforming, modeling, masking, machine learning, and the like can be applied as described in U.S. Pat. No. 8,958,608 to Santos-Villalobos et al.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Plenoptic Camera

In any of the examples herein, a plenoptic camera (sometimes called a "light-field camera") can capture a variety of information about a scene. A characteristic of plenoptic image data is that the image can be refocused after the image is captured.

Depth information can also be obtained from the plenoptic image data.

The actual hardware used to capture a plenoptic image data can vary. A single camera can be used, but a plenoptic camera system can use a plurality of cameras (e.g., microcameras or the like). Other techniques, such as optical heterodyning and the like can employed to implement a plenoptic camera.

Example 5—Example Iris Recognition Processing

In any of the examples herein, iris recognition processing can include a wide variety of processing including enrollment of subjects (e.g., adding their information to a gallery), verification (e.g., verifying that a subject matches information for an enrolled subject or identifying an unknown subject), and the like. Iris recognition processing can also take the form of determining whether or not a subject is wearing a contact lens.

In practice, an output indicates the results of processing, such as an identity (e.g., as determined from matching a gallery), a match, or whether the subject is wearing a contact lens.

Processing can include off-angle gaze processing (e.g., correcting the image, transforming the image, applying an eye model, or the like).

Example 6—Example Plenoptic Iris Image

In any of the examples herein, a plenoptic iris image can be an image of an iris captured by a plenoptic camera. Such an image is sometimes called a "light field," and can serve as the source image data from which reconstructed images can be generated. For example, synthetic images of different focus depths can be generated as described herein.

The image can also include depth data or raw data from which depth data can be calculated. The plenoptic image can be stored in a data structure that allows additional data, such as depth data, to be aggregated into the record as processing progresses.

Example 7—Example Fully Focused Image

In any of the examples herein, an image can be constructed with a plurality of synthetic focus settings. Such an image is sometimes called a "fully focused" image. However, the entire image need not be perfectly in focus. Instead, the image serves as an improvement over an image having only a single synthetic focus setting or an image captured by a conventional camera.

The fully focused image is synthetic in that it does not exist in an image having a single focus setting. Instead, it is a mosaic of different synthetic images that are themselves synthetically generated from the plenoptic image.

Example 8—Example Synthetic Focus Settings

In any of the examples herein, a synthetic focus setting can take a variety of forms. For example, a synthetic focus plane can be specified for a plenoptic image, and the resulting image will appear as if the focus setting were set at the focus plane.

As described herein, different images can be generated or reconstructed from the same input plenoptic image by specifying different synthetic focus planes for respective of the images (e.g., each reconstructed image has a different synthetic focus plane).

Example 9—Example Identification of In-Focus Regions or In-Focus Images

In any of the examples herein, focus can be measured via the amount of entropy in the image, the frequency response of the lines in the images, the contrast between neighboring pixels, or the like. Thus, in-focus regions of an image can be identified using such techniques. Similarly, the focus depth for a reconstructed image (e.g., sharp image) can be chosen using such techniques.

Example 10—Example Plenoptic Imaging for Iris Recognition

In any of the examples herein, iris recognition can benefit from plenoptic technology in that the iris can be imaged without concern of focus (e.g., at the time the image is captured). If the iris plane is outside the default focus plane, then the system can search for a different synthetic focus plane in the light field that produces a sharp iris image.

Another challenge in iris recognition is off-angle iris recognition. Given the fixed and short focal length of most iris scanners, their depth of field is too shallow to have an off-angle iris image fully in focus. Light field synthetic reconstructions of an off-angle iris may have the same problem, but because one can shift the depth of focus, one can reconstruct the iris at different depths. For each reconstructed depth, there can be a corresponding iris image with some regions in focus and other regions out of focus. The region in focus can be determined with the techniques described herein (e.g., entropy and the like).

Figure 4:
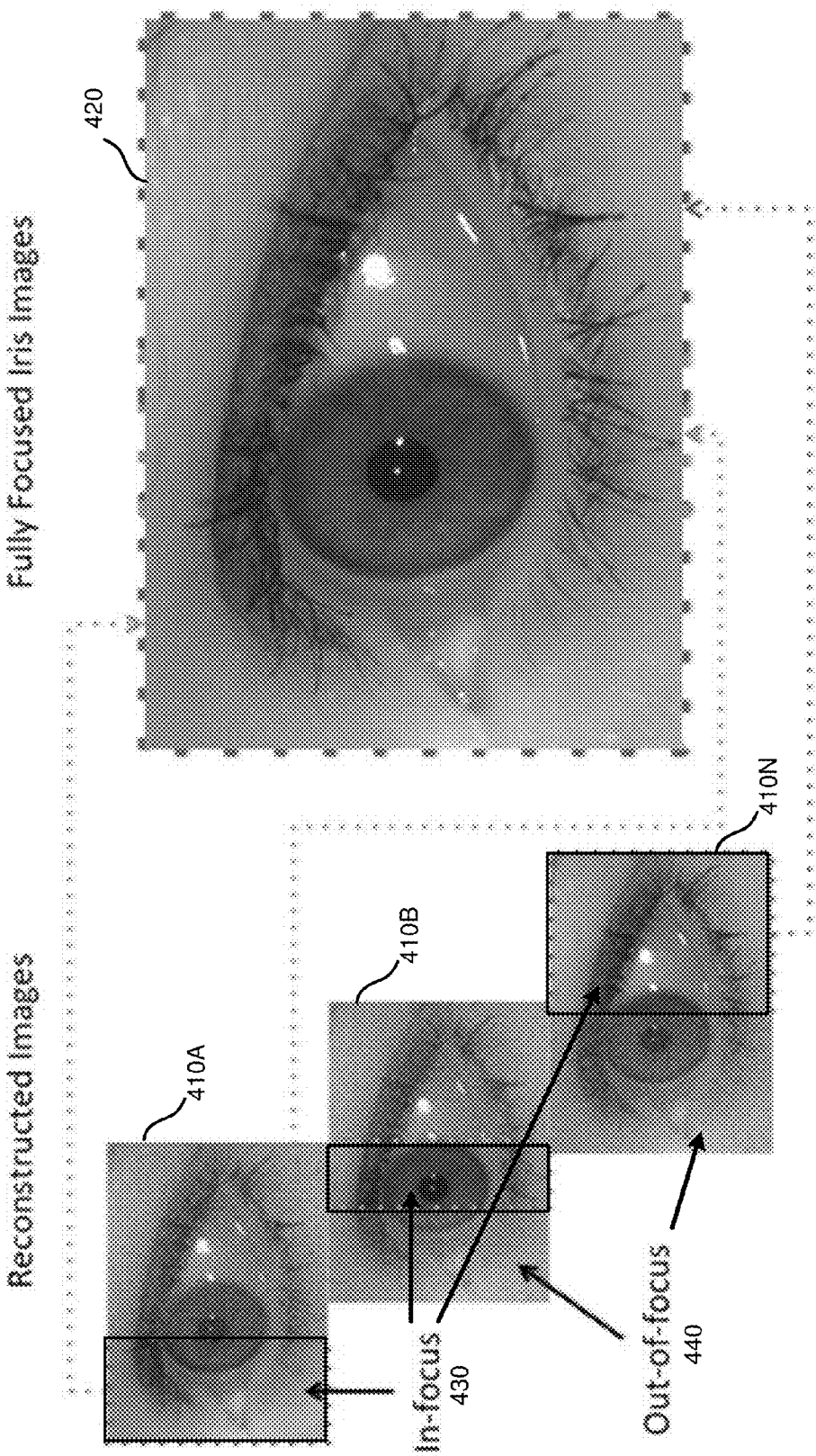
FIG. 4 is a block diagram of an example scenario involving stitching together synthetic images with different synthetic focus settings.

Then, as shown in FIG. 4, in-focus regions can be stitched together in order to generate a fully focused off-angle iris image. Several partially focused iris images (e.g., the in-focus regions therein) can be stitched together to form a fully focused iris image.

Example 11—Example Reconstructed Images

In any of the examples herein, reconstructed images can be generated from an incoming plenoptic image. For example, reconstructed images can contain different in-focus regions (e.g., different parts of the iris are in-focus). The in-focus regions can then be stitched together as described herein.

Figure 3A:
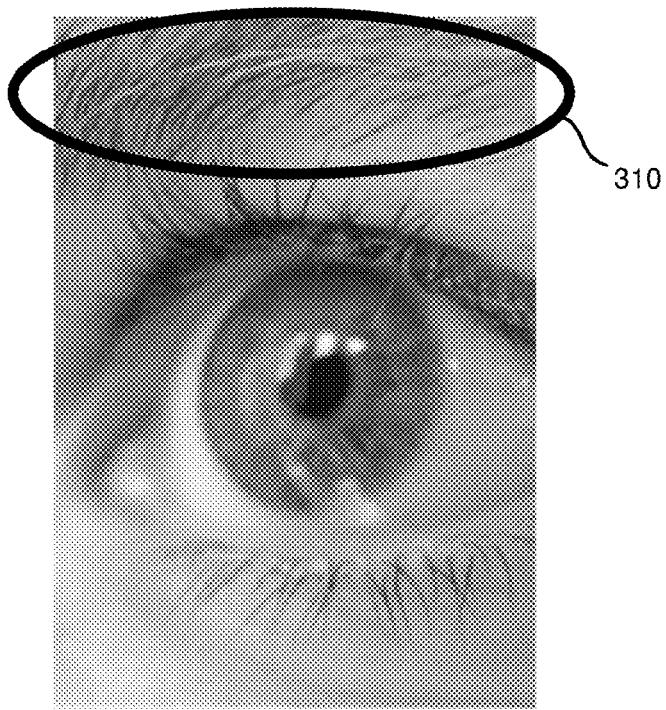
FIGS. 3A-B are reconstructed images generated from a plenoptic image of an off-angle iris with different synthetic focus settings.
Figure 3B:
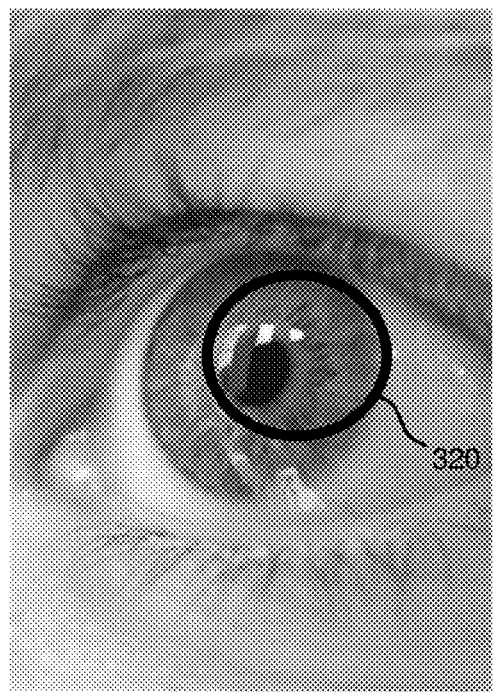

FIGS. 3A-B are reconstructed images generated from a plenoptic image of an off-angle iris with different synthetic focus settings. The images were reconstructed by specifying different synthetic focus depths for a same plenoptic image captured with a Lytro camera available from Lytro, Inc. of www.lytro.com. In the example of 3A, the eyebrows 310 are in focus. In the example of 3B, a portion 320 of the iris 320 is in focus.

A reconstructed image can be divided into a plurality of regions. At least one of the regions can be determined as being in focus. The in-focus region can then be used for the stitching together as described herein.

In practice, the plenoptic off-angle iris image can be divided into a plurality of overall regions. Respective of the reconstructed images can be identified as having in-focus regions corresponding to the overall regions. Stitching together can then stitch together the in-focus regions corresponding to the overall regions.

Another way to achieve generation of a fully focused image is to identify the in-focus regions in respective of the reconstructed images and then stitching them together as described herein.

FIG. 4 is a block diagram of an example scenario 400 involving stitching together reconstructed images 410A-N with different synthetic focus settings. In the example, the reconstructed images 410A-N are generated by applying different synthetic focus planes to the plenoptic image.

The resulting reconstructed images 410A-N contain in-focus 430 and out-of-focus 440 regions. The in-focus regions 430 are stitched together to yield the fully focused image 420. Although the example shows reconstructing an entire area of an image, in practice, only part of the image need be reconstructed (e.g., the area that contains the iris and possibly some neighboring area).

Example 12—Example Off-Angle Gaze

In any of the examples herein, an off-angle gaze can denote an eye or iris with a gaze angle other than that from a frontal perspective. For purposes of convenience, a completely frontal view (e.g., a gaze in line with the optical axis) can be denoted as 0 degrees or "on-axis." Off-angle gazes involve perspectives taken from off angles, where the angles are deviated from 0 degrees in a horizontal plane, a vertical plane, or both. For purposes of convenience, such angles are designated as $\theta_v$ for vertical gaze angles and $\theta_h$ for horizontal gaze angles (e.g., azimuth). In practice, a particular off-angle gaze may have one or both of vertical and horizontal components, and the technologies described herein can be applied to such scenarios. Some examples herein refer to a gaze angle without specifying horizontal or vertical; such angles are typically assumed to be $\theta_h$.

Figure 5A:
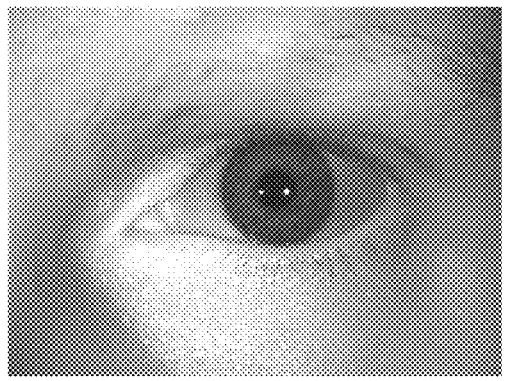
FIGS. 5A and 5B are eye images showing eyes at different gaze angles.
Figure 5B:
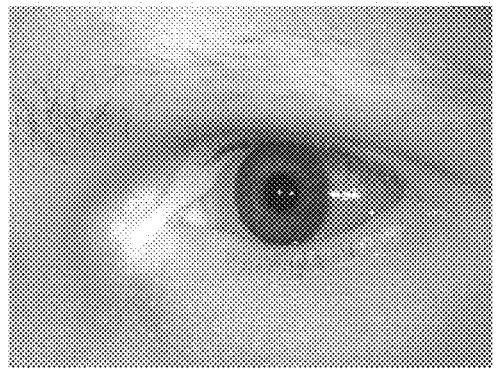

FIGS. 5A-B are eye images showing eyes at different gaze angles. The image of 5A comprises an on-axis (0 degrees) iris image, and the image of 5B comprises a 40 degree off-axis iris image. For an on-axis image, the eye and camera share the same optical axis, while for off-axis images, the axes have different directions. Technologies such as those described in U.S. Pat. No. 8,958,608 to Santos-Villalobos et al. can reconstruct (e.g., estimate) the image of 5A based on an input image resembling that of 5B.

Although the term "gaze" is used, the direction in which the eye is gazing (e.g., with respect to the gazer) can be independent of the gaze angle. For example, an iris image of a frontally gazing eye can be captured at a 30 degree angle, resulting in a 30 degree gaze angle. Thus, the term "gaze" can be used to denote the angle at which the eye is gazing with respect to the capture perspective.

The term "off-angle" can be used to denote an image or other representation of an eye or iris that exhibits an off-angle gaze. As described herein, the gaze angle can be at or more than 30, 40, 50, 60, or 70 degrees away from frontal.

Example 13—Example Capture of Three-Dimensional Information

Figure 6:
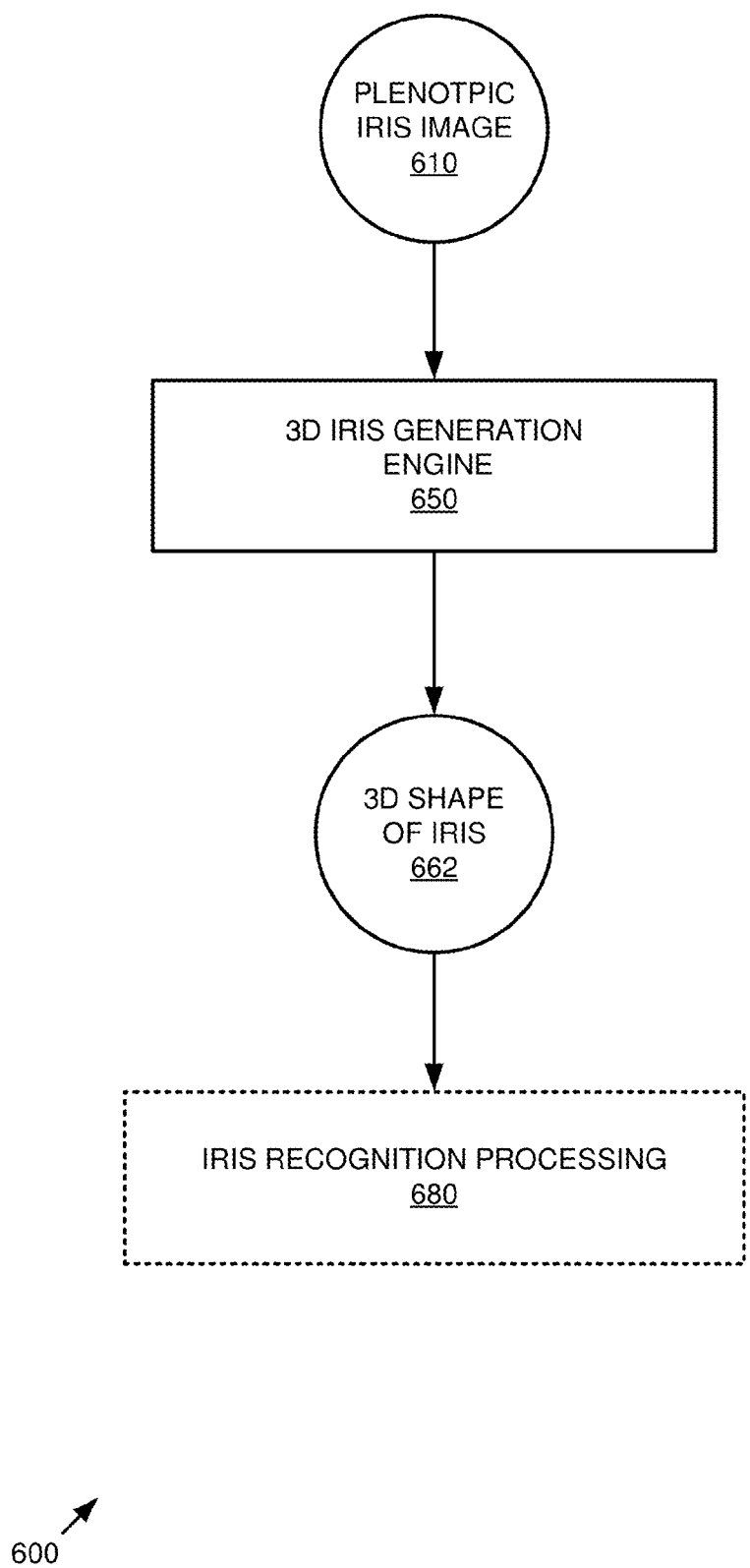
FIG. 6 is a block diagram of an example system capturing three-dimensional shape of an iris for iris recognition processing.

FIG. 6 is a block diagram of an example system 600 capturing three-dimensional shape of an iris 662 for iris recognition processing. In any of the examples herein, such a shape can be used in a personalized eye model for iris recognition processing.

In the example, a three-dimensional iris generation engine 650 accepts a plenoptic iris image 610 (e.g., an image of an iris captured by a plenoptic camera). The engine 650 can be configured to generate a three-dimensional shape 662 of the iris depicted in the image 610.

The three-dimensional shape of the iris 662 can be superior to the planar shape that would ordinarily be used in the alternative. Further, because eye geometry can vary from subject to subject, capturing the actual three-dimensional shape of the eye can lead to superior results when compared to a generic eye model. Eye models based on such captured three-dimensional information are sometimes called "personalized" eye models herein.

The three-dimensional shape of the iris 662 can be integrated into iris recognition processing 680, whether enrollment, verification, or both. For example, the shape 662 can be incorporated into a personalized eye model as described herein.

Example 14—Example Method Capturing Three-dimensional Shape of an Iris

Figure 7:
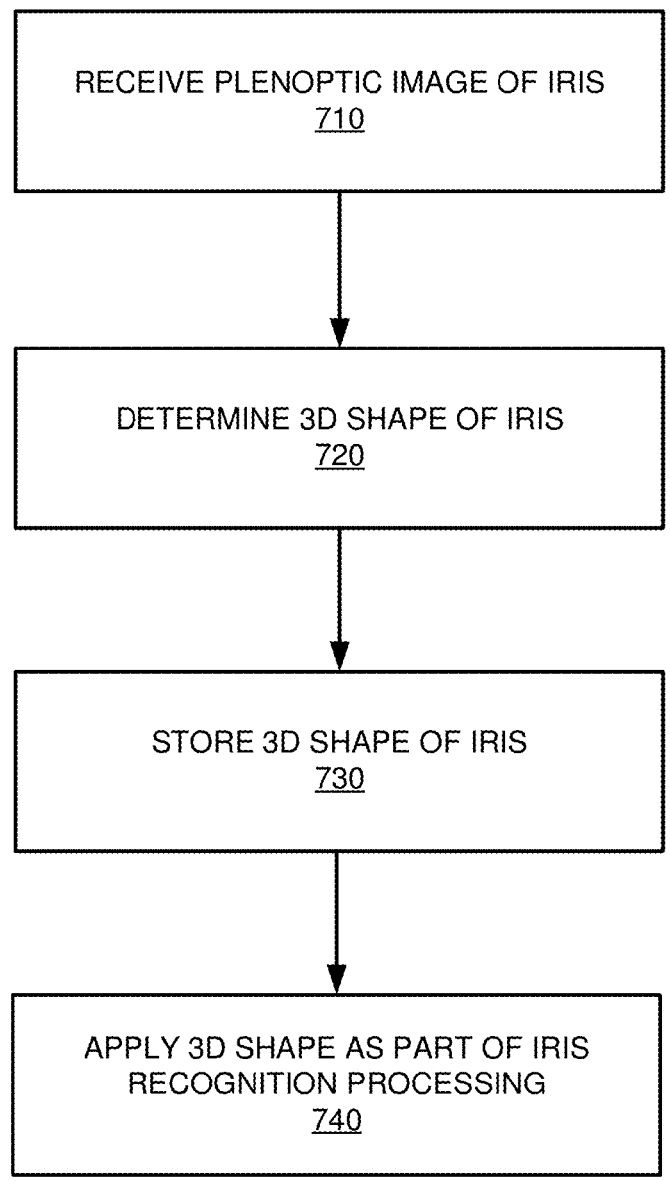
FIG. 7 is a flowchart of an example method of capturing three-dimensional shape of an iris for iris recognition processing.

FIG. 7 is a flowchart of an example method 700 of capturing three-dimensional shape of an iris for iris recognition processing and can be implemented, for example, via the system shown in FIG. 6.

At 710, a plenoptic image of an iris is received. For example, a plenoptic image of a subject's eye can be received.

At 720, the three-dimensional shape of the iris is determined. For example, a depth map of the image (e.g., the eye, iris, or the like) can be computed via the plenoptic image. The iris as depicted in the image can be segmented. Thus, the area of the image comprising the iris can be computed (e.g., via segmentation). The segmented iris can then be registered to the depth map so that the relative depths at points within the iris can be calculated. The image can be rotated if it is off-angle.

At 730, the three-dimensional shape of the iris is stored. For example, a format accommodating iris shapes can be used.

At 740, the three-dimensional shape is applied as part of iris recognition processing, whether enrollment, verification, or both. Such processing can include constructing a personalized eye model based on the three-dimensional shape of the iris, and iris recognition can be performed via the personalized eye model. For example, via the via the personalized eye model, a frontal view of an iris depicted in an off-angle iris image (e.g., the image used to construct the personalized eye model or some other image) can be reconstructed. Iris recognition can then be performed with the reconstructed frontal view.

From the plenoptic iris image, a three-dimensional shape of a limbus depicted in the plenoptic iris image can also be determined. The three-dimensional shape of the limbus can be stored, and it can be applied during iris recognition processing. For example, iris recognition can account for the three-dimensional shape of the limbus.

In cases where the plenoptic iris image depicts an iris with an off-angle gaze, a portion of the iris that is occluded by the limbus in an on-angle gaze can be determined based on the three-dimensional shape of the limbus. During iris recognition, the occluded portion can be removed from consideration (e.g., during segmentation).

Three-dimensional positional information of the iris and limbus can also be stored as described herein. In an off-angle gaze scenario, a portion of the iris that is occluded by the limbus in an on-angle gaze can be determined based on the three-dimensional position of the limbus. During iris recognition, the occluded portion can be removed from consideration (e.g., during segmentation).

Example 15—Example Three-dimensional and Shape Information

In any of the examples herein, three-dimensional and shape information can be stored in a variety of ways. For example, the three-dimensional information can be represented as a depth look up table that is used to associate pixel coordinates (e.g., in x,y space) with a depth or distance representing z as determined via the techniques described herein.

The three-dimensional coordinates of certain eye structures, such as the limbus ellipse, pupil ellipse, and specular highlights on the cornea can be used to estimate the position and angle of the eye relative to the camera as well as to estimate the three-dimensional shapes of such structures.

Such a representation can be used to create an optical model of the eye, where the iris is represented as a height field, and the limbus and cornea are represented using constructive geometry using primarily planes and ellipsoids.

The combined representation can serve as a personalized eye model that can be used with ray tracing technologies to recreate undistorted images.

Example 16—Example System Constructing Personalized Eye Model

Figure 8:
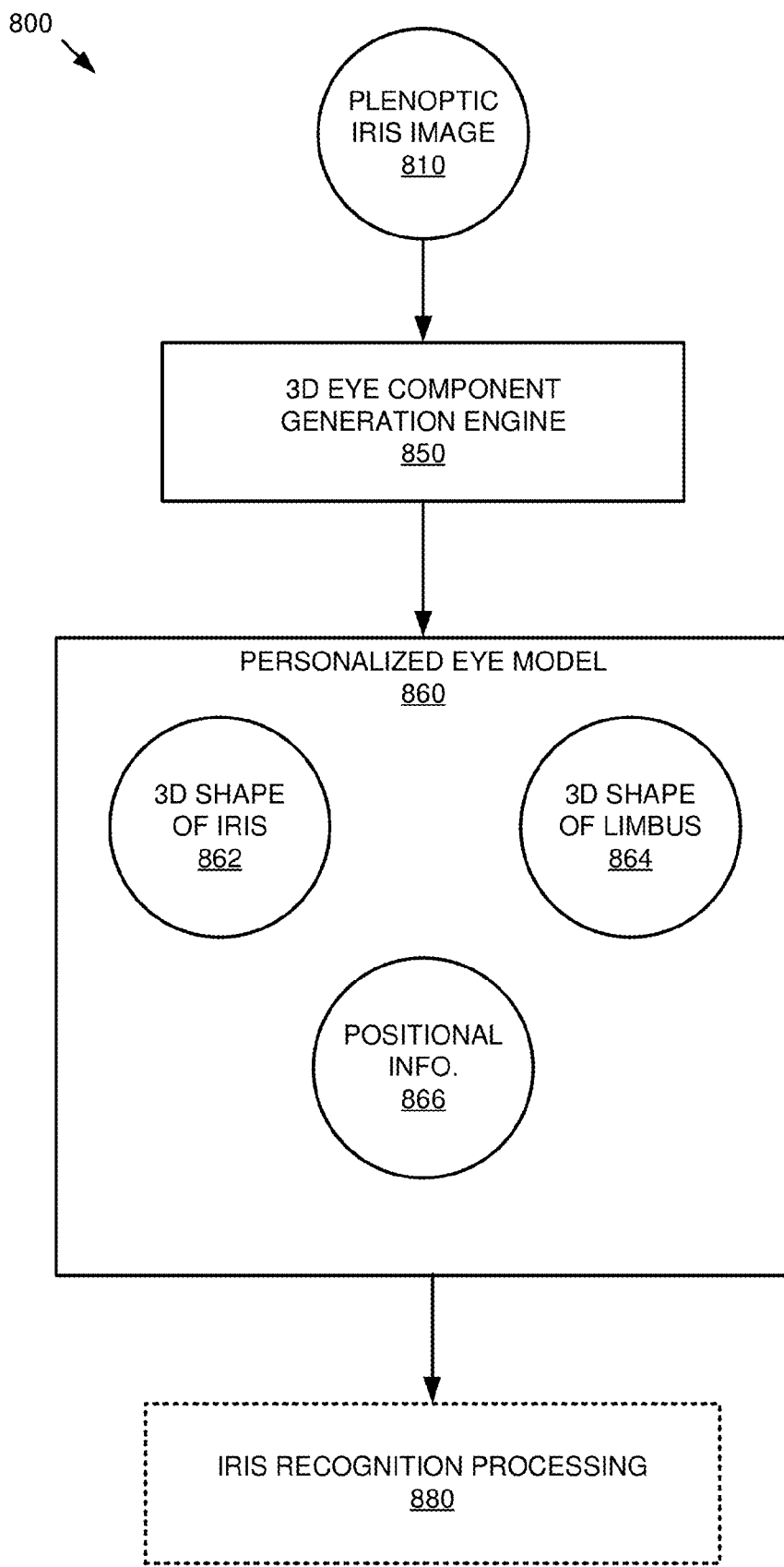
FIG. 8 is a block diagram of an example system constructing a personalized eye model for use in iris recognition processing.

FIG. 8 is a block diagram of an example system 800 constructing a personalized eye model for use in iris recognition processing. The system 800 operates to generate a personalized eye model 860 that can be used in conjunction with other systems to provide iris recognition processing.

In the example, an incoming plenoptic iris image 810 is processed by a three-dimensional eye component generation engine 850, which generates components of a personalized eye model 860. For example, the three-dimensional shape of an iris 862 can be generated as described herein. The three-dimensional shape of the limbus 864 can also be generated, along with transparency, thickness, and height of the limbus depicted in the image 810. Three-dimensional positional information 866 can indicate the position of the various components of the model 860. In practice, the position can be relative (e.g., a component's position is indicated relative to a reference point or another component).

In practice, the personalized eye model 860 can comprise additional information.

As shown, the personalized eye model 860 can then be applied to iris recognition processing, whether enrollment, verification, or both. For example, the shape of eye components can be used to better achieve recognition.

A typical iris recognition system assumes that the eye is looking directly at the camera when photographed. Such systems are incapable of correcting the distortions to the iris shape introduced (e.g., by the cornea) when the iris is imaged from off-angle. The personalized eye model can serve as a custom optical model for an image and allows the iris to be rendered as if the image were taken in a frontal orientation to allow the matching software to accurately identify the iris.

Example 17—Example Method of Constructing Personalized Eye Model

Figure 9:
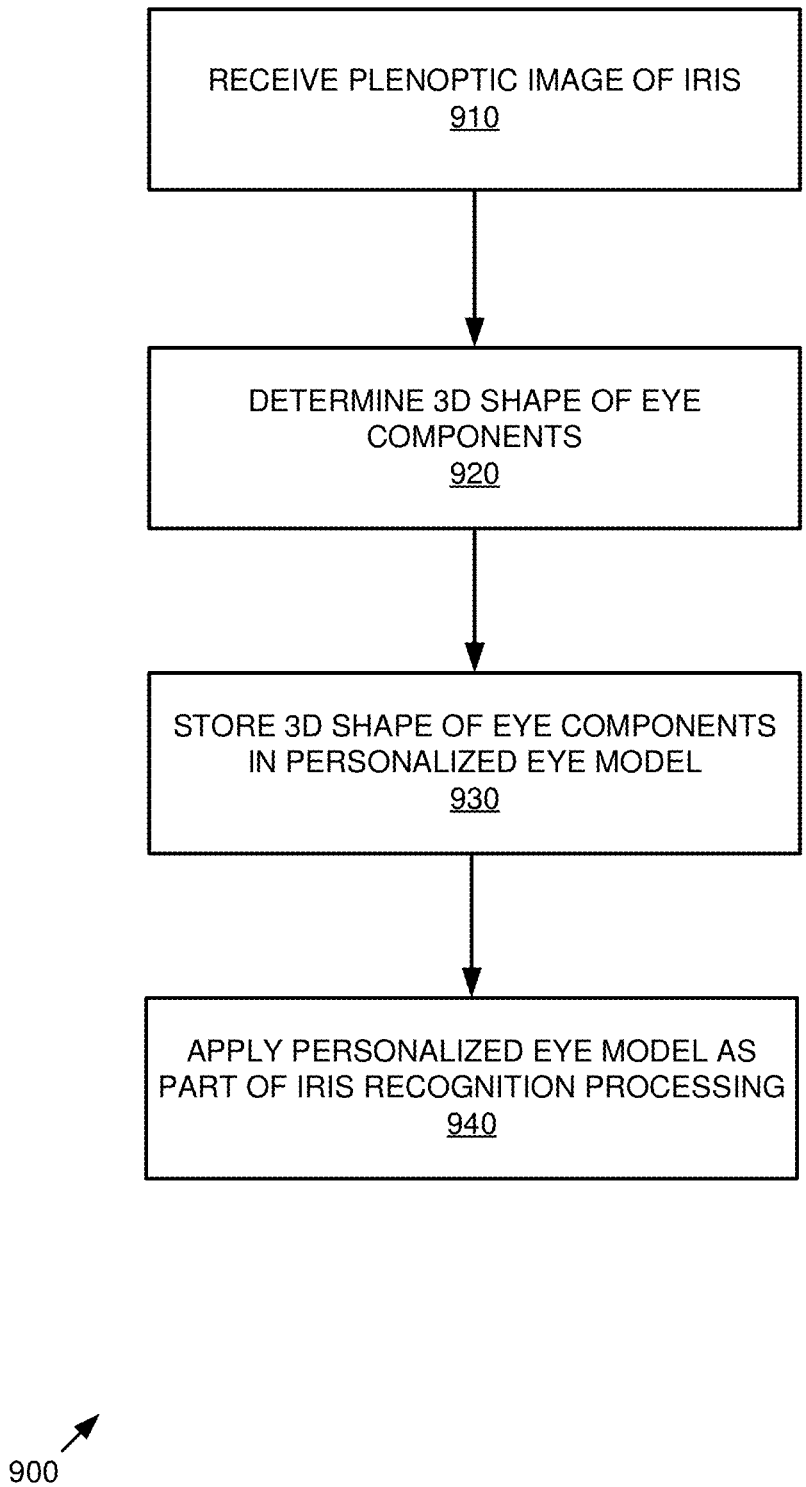
FIG. 9 is a flowchart of an example method of constructing a personalized eye model for use in iris recognition processing.

FIG. 9 is a flowchart of an example method 900 of constructing a personalized eye model for use in iris recognition processing and can be implemented, for example, in a system such as that shown in FIG. 8.

At 910, a plenoptic image depicting an iris is received.

At 920, the three-dimensional shape of eye components is determined. As described herein, such eye components can comprise the iris, limbus, and the like.

At 930, the three-dimensional shape of the eye components is stored in a personalized eye model.

At 940, the personalized eye model is applied as part of iris recognition processing (e.g., enrollment, verification, or both).

Example 18—Example Eye Model

In any of the examples herein, an eye model can be used to model the biology and anatomy of an eye when performing analysis on images or generating precomputed transformations that are subsequently used as part of iris recognition processing. As described herein, the model can be anatomically based. An aspherical eye model can be used. The aspherical shape can be symmetrical (e.g., near-sphere, ellipse) or asymmetrical (e.g., melon shape). The aspheric shape can be corrected to account for defects such as astigmatism. Components (e.g., structures) within the eye, such as the limbus, cornea, aqueous humor, and the iris itself can be modeled via the model. The elements of the model can be grouped conceptually even if stored separately.

In practice, the eye model is a collection of digital parameters that can model three-dimensional or two-dimensional structures, account for an index of refraction, the position of structures within the eye, the gaze angle, and the like.

In the example, the model can include aspherical dimensions as described herein, aqueous humor characteristics, iris characteristics, and cornea characteristics.

Limbus effect logic can simulate the effects of occlusion by the limbus and can include physical characteristics of the limbus.

Although a generalized eye model can be used with success, a personalized eye model can be used to model individuals, subpopulations, or the like. As described herein, the eye model can be personalized by acquiring three-dimensional shape information about eye components and storing them as part of the eye model when performing iris recognition.

Example 19—Example Reconstructed Synthetic Eye

In any of the examples herein, a synthetic eye can be constructed for use in reconstructing a frontal view. In practice, an off-angle image can be used to construct the synthetic eye (e.g., the iris). A digital representation (e.g., map) of the iris can thus be stored.

Subsequently, a simulated frontal view of the synthetic iris (e.g., with a synthetic camera) can be used to reconstruct a frontal view of the iris portrayed in the off-angle image. Corneal refraction, limbus effect, and other effects can be modeled because actual (e.g., non-reconstructed) frontal images involve such effects.

Example 20—Example Three-Dimensional Feature Extraction

In any of the examples herein, three-dimensional feature extraction can be performed. The capture of off-axis irises is a challenge due to the shallow depth of field of most near-field imaging systems. However, the off-axis iris is also affected by perspective deformation and optical deformation. The former is a consequence of a slant view of the eye; while the latter is due to the refraction of light rays at the corneal interface.

Figure 20:
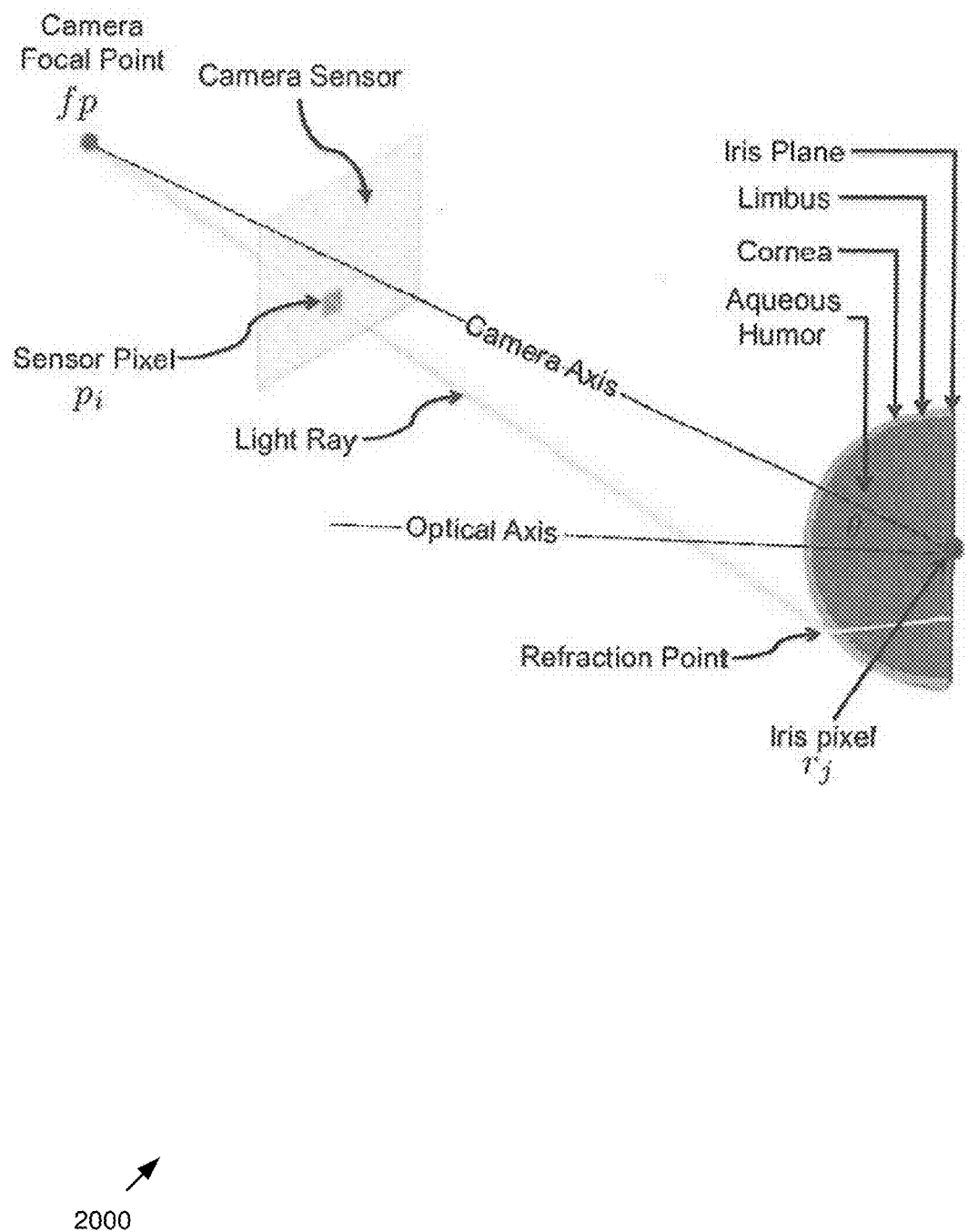
FIG. 20 is a block diagram showing a ray trace model for reconstructing a frontal view.

A model-based technology can be used to transform the off-axis iris to its frontal view as described in U.S. Pat. No. 8,958,608 to Santos-Villalobos et al. A generalized eye model and camera model can be used to trace light rays from an off-axis iris image to the eye model iris plane, and finally to the image plane of an on-axis positioned camera (e.g., as shown in FIG. 20). Then, the on-axis projection of the off-axis iris is used for recognition. The model-based technologies can address perspective and cornea refraction deformations.

Such a model-based method can yield superior results. However, the accuracy of the model can be improved. If the model-based technology models the iris as planar, it is somewhat inaccurate because the iris surface is irregular and varies by approximately 0.5 mm. In addition, the size of the limbus cannot be correlated to the size of any other eye component. Because the limbus can be important for iris segmentation, a generalized model-based technology may not work for a large set of subjects, given that the geometry of the eye varies significantly from person to person.

Improved off-axis iris recognition can be achieved by generating a person-specific eye model for a subject enrolled in an iris gallery (e.g., for a plurality of enrolled subjects, the subjects have a respective personalized eye models). The eye model can be personalized by estimating the shape of a subject's eye components with a plenoptic camera. One can replace the planar iris with an irregular three-dimensional surface of a person-specific iris, the limbus with its actual transparency, thickness, and height, and the position of the eye components. The three-dimensional shape of the iris and limbus can be estimated from the light field captured with a plenoptic camera.

The plenoptic camera can capture slightly different perspectives of the eye. A depth map of the eye can be computed using shape-from-stereo and shape-from-shading techniques. The eye components can be segmented and registered to the depth map in order to estimate the geometry of the eye components. Consequently, the eye model can be personalized for the subject by replacing the generalized limbus model and generalized iris model with the estimated components.

The estimation of the limbus and iris components can be used to feed existing iris segmentation algorithms. In particular, for off-axis eye images, the limbus occludes part of the iris, commonly leading to incorrect iris segmentation. By estimating the three-dimensional shape and position of the limbus, the occluded area can be correctly identified, which can result in a more correct segmentation of the iris. As a consequence of better iris segmentation, recognition of off-axis irises is improved.

Example 21—Example System Detecting an Obfuscating Contact Lens

Figure 10:
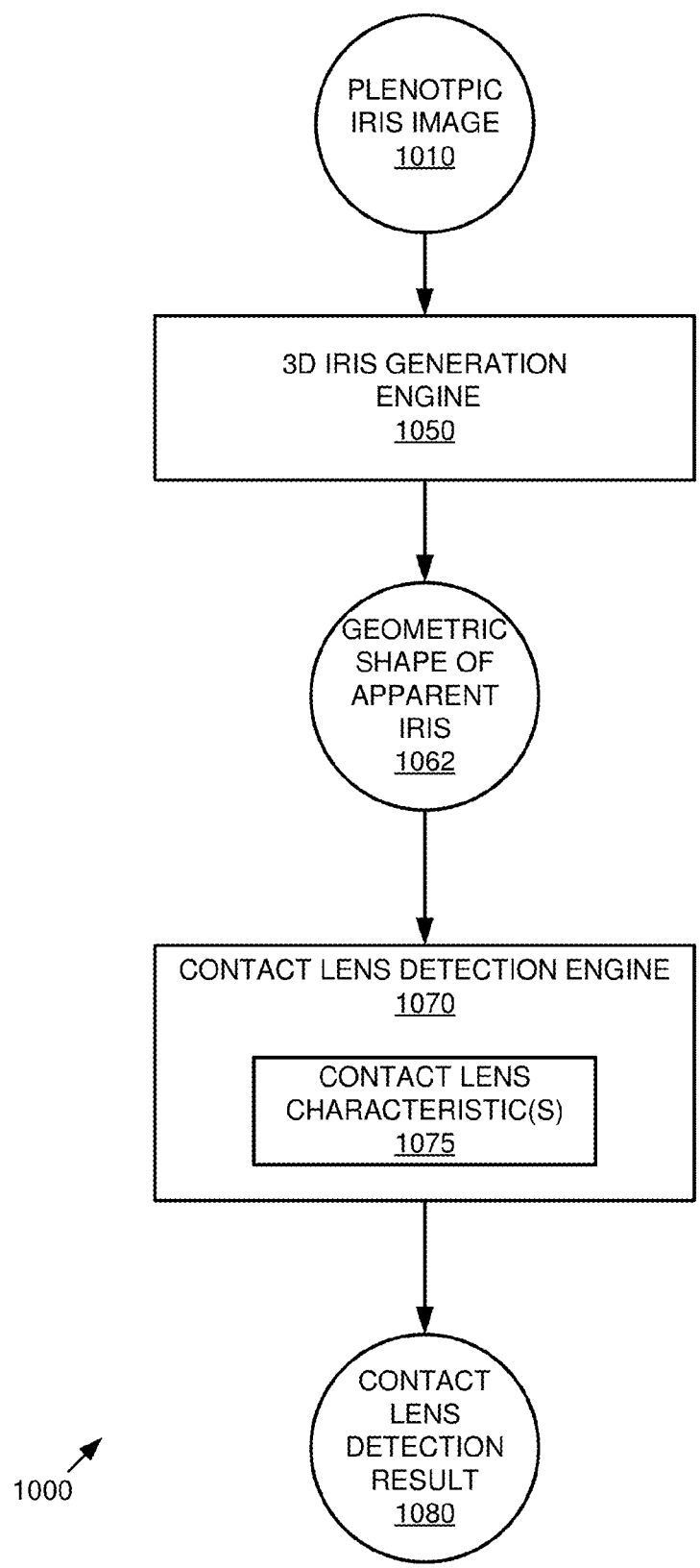
FIG. 10 is a block diagram of an example system detecting a contact lens in a plenoptic iris image.

FIG. 10 is a block diagram of an example system 1000 detecting a contact lens in a plenoptic iris image (e.g., light field). In the example, the plenoptic iris image 1010 may involve an iris that is covered by a contact lens. Such coverage can be physical, optical, or both, and the coverage may be partial or complete. Thus the image 1010 can depict an apparent iris, whether or not the iris of the subject is actually visible.

A three-dimensional iris generation engine 1050 can generate a geometric shape of the apparent iris based on the plenoptic iris image 1010. For example, a depth map can be generated as described herein.

A contact lens detection engine 1070 can analyze the geometric shape 1062 with respect to one or more contact lens characteristics 1075 (e.g., the shape of a contact lens) and output a contact lens detection result 1080.

Example 22—Example Method of Detecting Contact Lens

Figure 11:
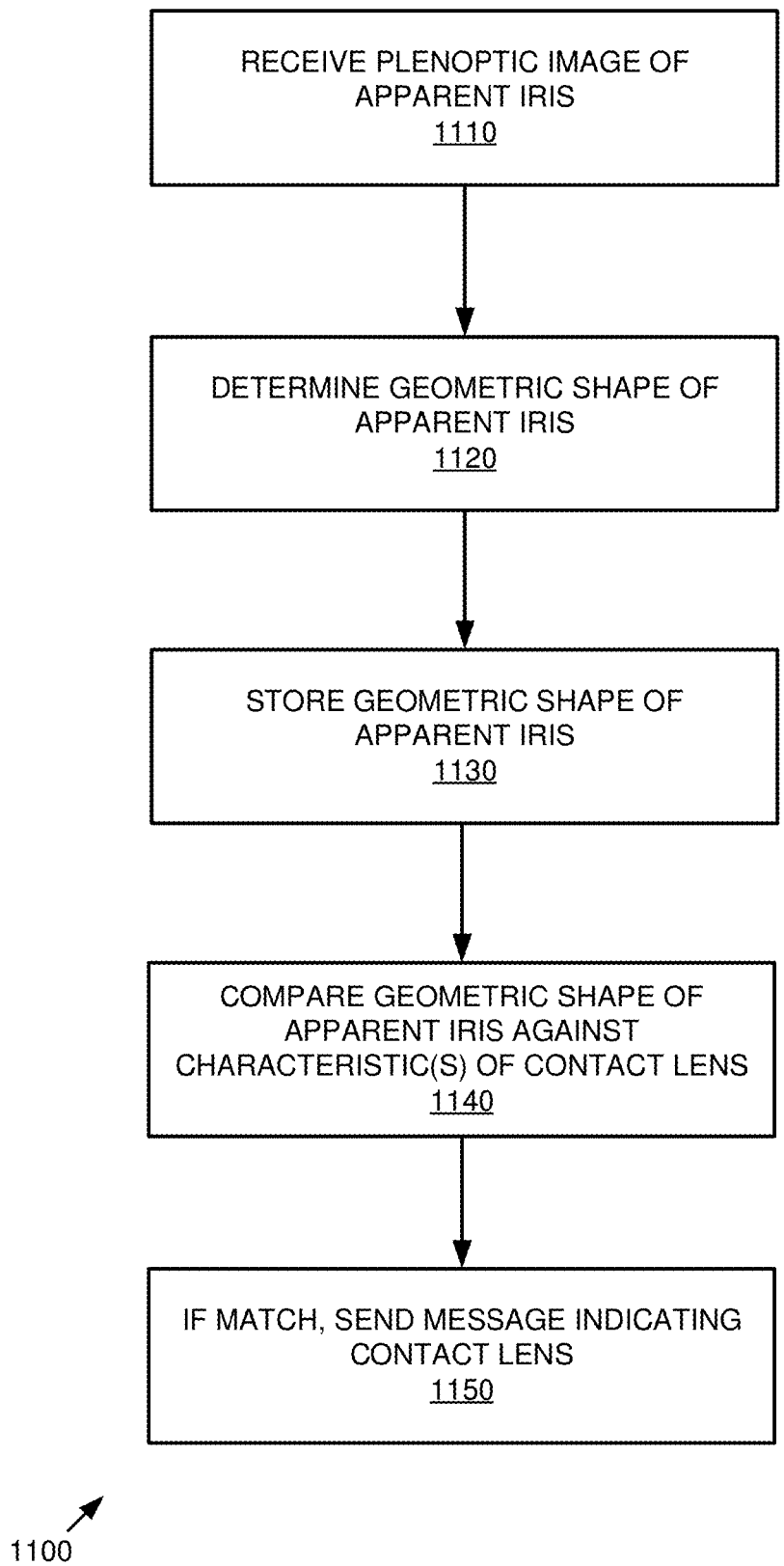
FIG. 11 is a flowchart of an example method of detecting an obfuscating contact lens in a plenoptic iris image.

FIG. 11 is a flowchart of an example method 1100 of detecting an obfuscating contact lens in a plenoptic iris image and can be implemented, for example, in the system shown in FIG. 10.

At 1110, a plenoptic image of an apparent iris is received.

At 1120, the geometric shape of the apparent iris is determined based on the plenoptic image. For example, a depth map can be used as described herein.

At 1130, the geometric shape of the apparent iris is stored.

At 1140, the geometric shape of the apparent iris is compared against one or more characteristics of a contact lens. For example, the shape (e.g., curvature) of the iris can be compared against a threshold. A confidence score can also be generated.

A common technique for defeating iris biometrics is to wear a contact lens with a false iris texture printed on the surface. Such lenses are commonly used for cosmetic purposes for changing eye color, but they can be inadvertently or intentionally interfere with the iris recognition process. If such an obfuscating contact lens is present, the depth map will indicate that the iris pattern is placed on the surface of the cornea. The obfuscating contact lens can be distinguished from a depth map where the iris is imaged through the optics of the cornea.

Eccentricity can be used to represent curvature and thus shape. The curvature of the iris texture can be estimated by fitting an ellipsoid surface to the portions of the depth map corresponding to the iris, and the eccentricity of the ellipsoid indicates if an obfuscating lens is present.

When the characteristics comprise a threshold curvature, the curvature of the shape of the apparent iris can be compared against the threshold curvature.

At 1150, if there is a match between the image and the characteristics, a contact lens is indicated, so a message indicating presence of the contact lens can be sent.

Example 23—Example Geometric Shape

In any of the examples herein, the geometric shape of an apparent iris can be generated from a plenoptic image. In practice, the shape is a three-dimensional shape. However, it can be represented as a two-dimensional geometry (e.g., a plane or a dome) that is a two-dimensional slice of the actual three-dimensional shape.

Example 24—Example Contact Lens

In any of the examples herein, a contact lens can include cosmetic contact lenses, colored contact lenses, printed contact lenses, or the like. In some cases, a contact lens can cover or otherwise distort the iris, and is therefore sometimes called an "obfuscating contact lens." For convenience, such lenses are sometimes called "printing patterns" contact lenses. The plenoptic image can include optical depth information for such lenses, allowing their detection as described herein.

Figure 12:
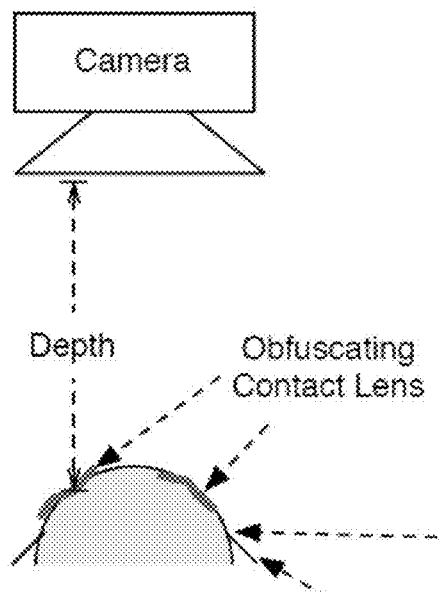
FIG. 12 is a block diagram of an example comparison of a contact lens configuration with a naked eye configuration.
Figure 12:
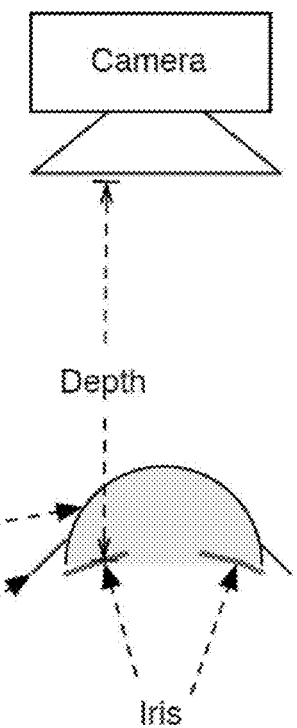
Figure 12:
Figure 12:

FIG. 12 is a block diagram 1200 of an example comparison of an obfuscating contact lens configuration with a genuine iris configuration. Geometry estimation of eye components where a subject is wearing a contact lens with printing patterns (left) and no contact lens with printing patterns (right) are shown. Depth information can be obtained as shown.

As can be seen, shape information will differ dramatically in the two configurations. The limbus can also be taken into account when detecting the contact lens.

Example 25—Example Contact Lens Detection Result

In any of the examples herein, a contact lens detection result can indicate the results of detecting an obfuscating contact lens. For example, the result can simply indicate a yes/no (e.g., Boolean) result, a confidence score (e.g., 95% confident), or both (e.g., 95% confident no contact lens). In practice, a message can be sent to an iris recognition system indicating that an apparent iris in the image is covered by a contact lens. In practice, such a message can be accepted by iris recognition software and an appropriate warning displayed responsive thereto (e.g., "the subject is wearing a contact lens," "remove contact lens," etc.).

Example 26—Example Combination of Obfuscating Contact Lens Detection with Three-Dimensional Feature Extraction In any of the examples involving three-dimensional feature extraction, obfuscating contact lens detection can be incorporated. For example, based on the three-dimensional shape of the iris, it can be determined that no obfuscating contact lens is present. Responsive to such determination, iris recognition processing can continue.

Example 27—Example Detection of Printing Pattern Contacts

In any of the examples herein, a contact lens with printing patterns can occlude the underlying iris pattern. Consequently, a subject is to remove such devices before being imaged by the iris recognition system to avoid inaccurate results. Consequently, it is desirable for the iris recognition system to detect the use of such contact lenses.

As described above, the geometry of the eye can be estimated from the light field of a plenoptic camera. If a subject is wearing a contact lens with printing patterns, the estimated iris will appear as a dome, while an iris seen through the transparent cornea should have a shape more similar to a plane. Consequently, by analyzing the shape of the estimated iris geometry, one can detect if the subject is wearing a contact lens that may be changing the underlying pattern of the iris.

A contact lens detection result can indicate the results of detecting an obfuscating contact lens. For example, the result can simply indicate a yes/no (e.g., Boolean) result, a confidence score (e.g., 95% confident), or both (e.g., 95% confident no contact lens). In practice, a message can be sent to an iris recognition system indicating that an apparent iris in the image is covered by a contact lens. In practice, such a message can be accepted by iris recognition software and an appropriate warning displayed responsive thereto (e.g., "the subject is wearing a contact lens," "remove contact lens," etc.).

Example 28—Example Preprocessing Before Recognition

In any of the examples herein, the resulting image can be used in a preprocessing scenario. For example, the stitching, reconstructing, three-dimensional modeling or other processing can be performed as image preprocessing before submission to iris recognition logic or software. The iris recognition software can be provided by a third party. The preprocessing can be performed by a plug-in or other extension to the iris recognition software or be fully integrated therein.

Submission of the resulting image to iris recognition software can result in superior iris recognition performance, even at large gaze angles.

Example 29—Example Light Spectra

In any of the examples herein, processing can be performed on a variety of light spectra. For example, visible light can be used, but infra-red and ultraviolet wavelengths can also be included or used in the alternative.

Example 30—Example Plenoptic Systems

Figure 13A:
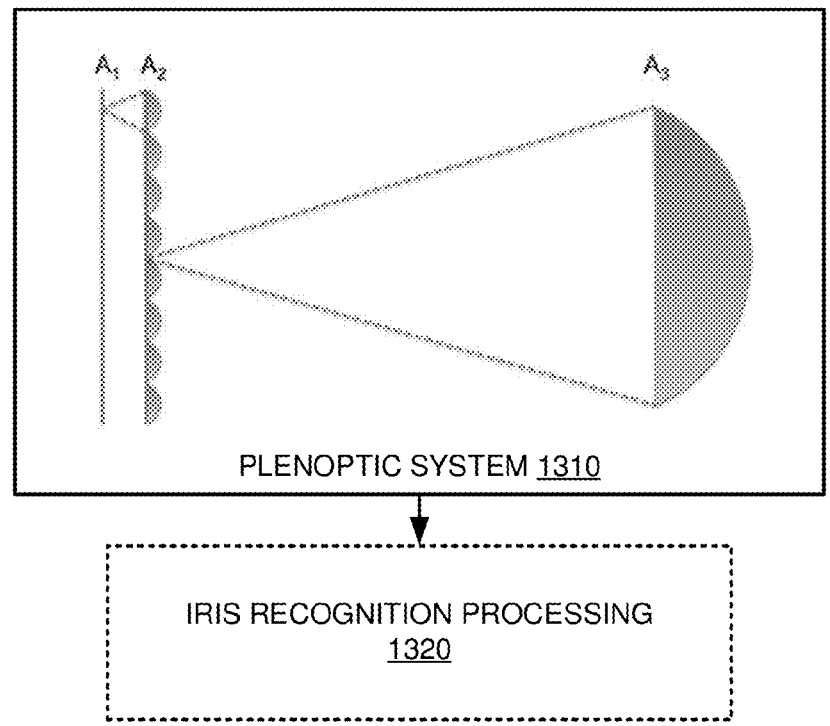
FIGS. 13A and 13B are block diagrams comparing different plenoptic systems.
Figure 13B:
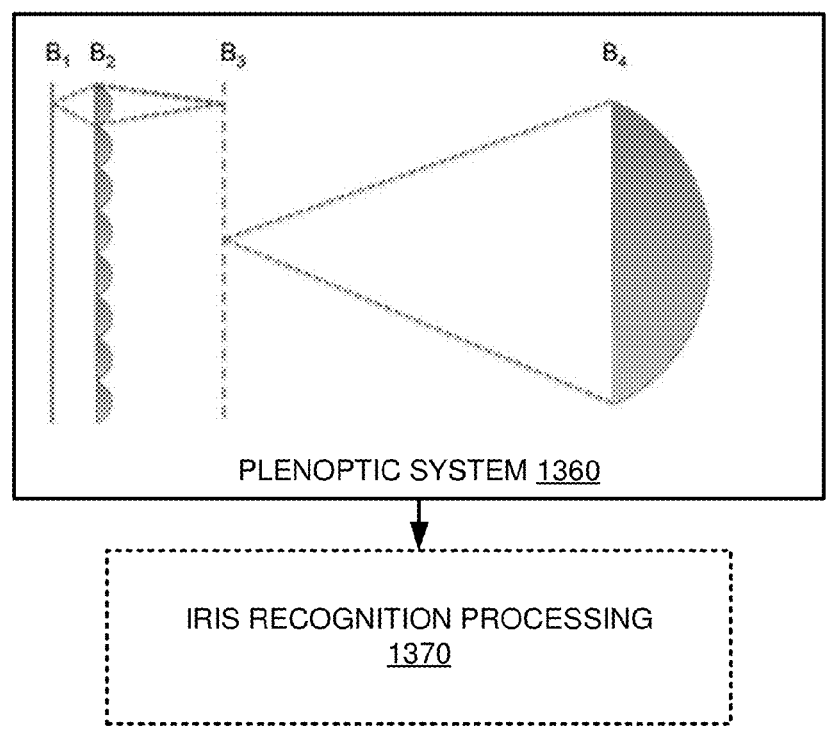

FIGS. 13A and 13B are block diagrams comparing different plenoptic systems 1310 and 1360. In the examples, the systems 1310, 1360 generate images that can be processed by an iris recognition processor that performs iris recognition processing 1320, 1370 as described herein.

A conventional camera is composed of a main lens and a photon detector. The main lens of a camera is typically a system of lenses that corrective optical aberrations and focus photons to an image plane. On the other hand, the plenoptic camera integrates a microlens array to the imaging system. As shown in FIGS. 13A and 13B, there are two main configurations for a plenoptic camera. FIG. 13A illustrates the design of the original plenoptic camera ("plenoptic 1.0"). The system 1310 has components $A_1$, $A_2$, and $A_3$, which are the detector, microlens array, and main lens, respectively. FIG. 13B illustrates the design of the focused plenoptic camera ("plenoptic 2.0"). The system has components $B_1$, $B_2$, $B_3$, and $B_4$, which are the detector, microlens array, virtual image plane (focal plane for main lens), and the main lens, respectively. Additional configurations can be implemented.

For both designs, the microlens array is placed between the main lens and the detector. For plenoptic 1.0, the main lens reproduces the object at the microlens array plane, while for the plenoptic 2.0, the main lens reproduces the object at a virtual plane, and the optics of the microlens array are selected in order to focus each microlens to the virtual image plane and also generate focused copies of the virtual image plane at the detector. The fundamental difference between plenoptic 1.0 and plenoptic 2.0 is that plenoptic 1.0 trades spatial resolution (i.e., fewer pixels image the scene) for angular resolution, while plenoptic 2.0 trades angular resolution (i.e., fewer synthetic perspectives and focused planes) for spatial resolution.

Other than a decrease in spatial resolution, plenoptic cameras have several advantages over the conventional camera. For example, the image of a scene can be refocused after the picture is taken (e.g., as shown in FIGS. 3A and 3B). The image can be focused to different depths, and also the viewpoint can be modified. One classic photography trick to enhance a picture dynamic range is to capture the scene with two different exposures (e.g., 100% and 20% exposures). Then, the short exposure image is used to correct over-saturated objects in the full exposure image. For conventional photography, the technique requires two separate exposures in time. For a plenoptic camera, a checkerboard filter mask is placed at the main lens or at the microlens array in order to capture the scene at two different illumination exposures with a single exposure. In this way, the dynamic range enhancement can be applied to moving objects. A similar filter mask with multiple different band-pass regions can be used to capture multispectral images with a single exposure.

A very useful feature of plenoptic cameras is the ability to measure depth from the light field. A light field contains information about the direction of rays reflecting from the object in a scene. This direction information allows the reconstruction of the scene from different perspectives. Therefore, computer vision techniques like depth from stereo can be used to estimate depth and three-dimensional shape of an object. From depth estimation, one can generate images where the extent of the scene is in focus. Objects in a stack of images are segmented based on their depth, and non-overlapping regions of focused objects (or portions thereof) at different depths are stitched together in order to generate a fully in-focus image with a large depth of field.

Example 31—Example Application to Iris Recognition

The human iris is one of the most reliable biometrics, given its high degree of entropy per unit area. Moreover, this biometric signature is less intrusive, hard to change, and virtually constant as the person ages. However, the fact only holds for high quality images of frontal irises or ideal irises. The quality of the iris image is a function of focus blur, occlusions, lighting, the number of sensor pixels across the iris, and other factors. A low quality iris is considered a non-ideal iris. The recognition of non-ideal irises is a field of extensive research, but no comprehensive solution has been engineered yet, particularly for off-axis irises.

A traditional camera has access to the light field of a scene, but of the acquired two-dimensional image is a reduction of the largest fourth-dimensional light field space. By translating the position of the camera optics, the camera can focus at different depths of the imaged object. However, the operator can only pick a particular focus depth when acquiring an image. In particular to iris imaging, the fixed focal length of the optics found in most current iris scanners makes those systems prone to capture non-ideal images due to the shallow depth of field. A plenoptic camera does not have such limitations. From the light field, several images focused at different object's depths can be generated synthetically (i.e., in the computer or processing chip after the image is captured by the camera).

Figure 14:
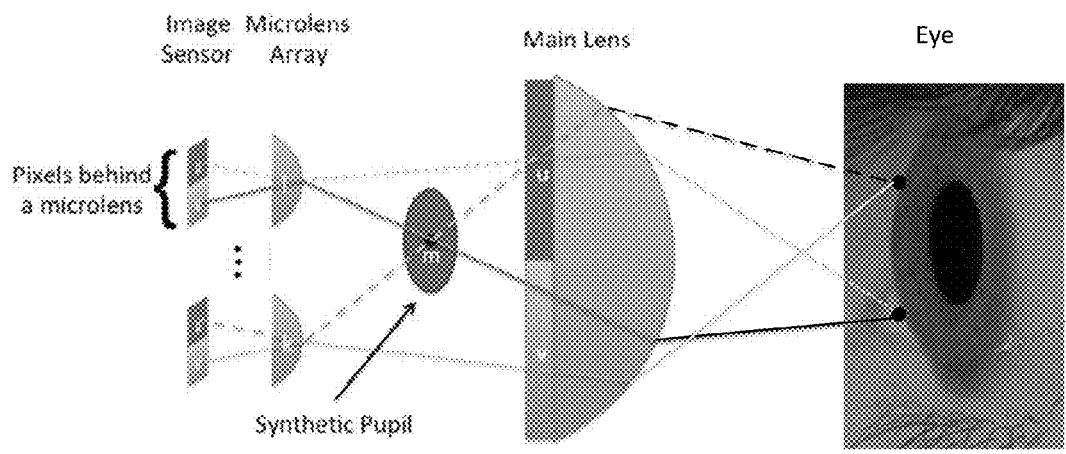
FIG. 14 is an illustration of light field sampling with two-pixel angular sampling.

FIG. 14 is an illustration of how the light field can be sampled with a plenoptic camera. For simplification, the camera design is based on a plenoptic 1.0 scheme (i.e., the main lens focuses light rays directly at the microlens array), reduced to a two-dimensional drawing and with only two pixels to sample angular information. One can extend the design to three-dimensional scenarios and with several microlenses and angular pixels.

As shown in FIG. 14, the pixels behind a microlens correspond to a region in the main lens. The main lens focuses photons from points in the object (e.g., eye) to the corresponding microlens and is done in the traditional camera. Then, given the angle of the photon ray, the microlens will focus the photon ray to the corresponding angular pixel. In the illustration, photon rays with angles greater than zero go through the main lens region "u" and are binned in the microlens pixels "u." Otherwise, the rays correspond to the "v" region and pixels for the main lens and microlenses respectively. Rays hitting a particular microlens correspond to a point in the object space while those passing through a main lens region correspond to a particular ray angle and their storage index is known.

Note that the above description reduces image reconstruction to the process of finding the line/point intersections of rays passing through a main lens region and microlens that correspond to a particular focus plane.

In order to focus to a given point, one can define a synthetic aperture or pupil as shown in FIG. 14. The pupil is centered at any position m between the main lens and the microlenses. Each different pupil position corresponds to a different focus plane and/or perspective at the object space. Rays intersecting the point m as shown in FIG. 14 are used to reconstruct an image of the object at a certain focus depth. Positioning the pupil at extreme positions as too close to the microlenses or the main lens can limit the number of ray samples for such an extreme position, which may produce low quality reconstructions. Some of the rays may not exactly intersect the center of the pupil; consequently, interpolation techniques may be applied to determine the proper weight of rays passing through the synthetic pupil.

Example 32—Example System Implementing Reconstruction Via Eye Model

Figure 15:
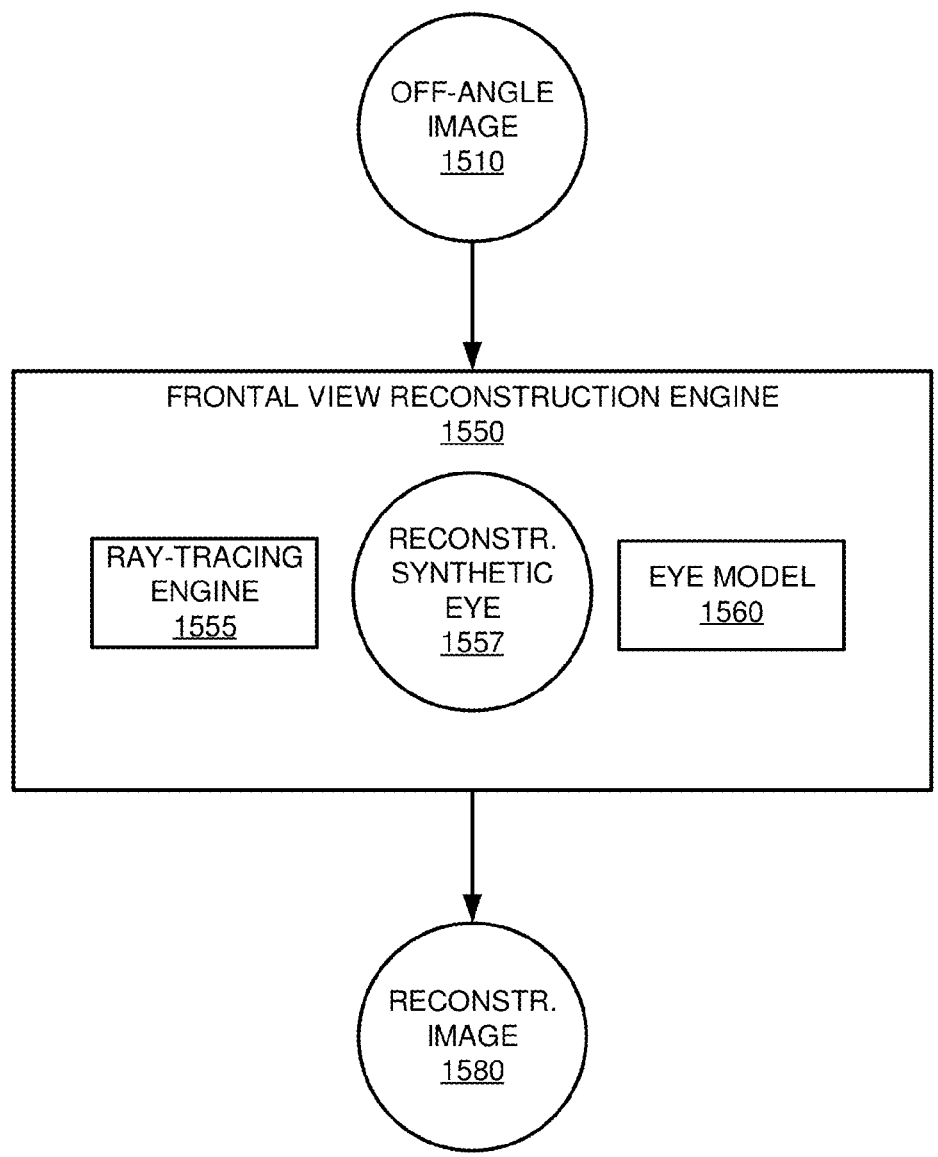
FIG. 15 is a block diagram of an example system implementing frontal view reconstruction via an eye model.

FIG. 15 is a block diagram of an example system 1500 implementing frontal view reconstruction via an eye model. In the example, the frontal view reconstruction engine 1550 accepts an off-angle image 1510 as input and outputs the reconstructed image 1580.

The frontal view reconstruction engine 1550 can comprise a ray-tracing engine 1555 and an eye model 1560 that can be used to generate a synthetic eye 1557. A frontal view of the synthetic eye can then be generated for use as the reconstructed image 1580. Additional image processing and filtering can be performed.

Example 33—Example Method Implementing Reconstruction Via Eye Model

Figure 16:
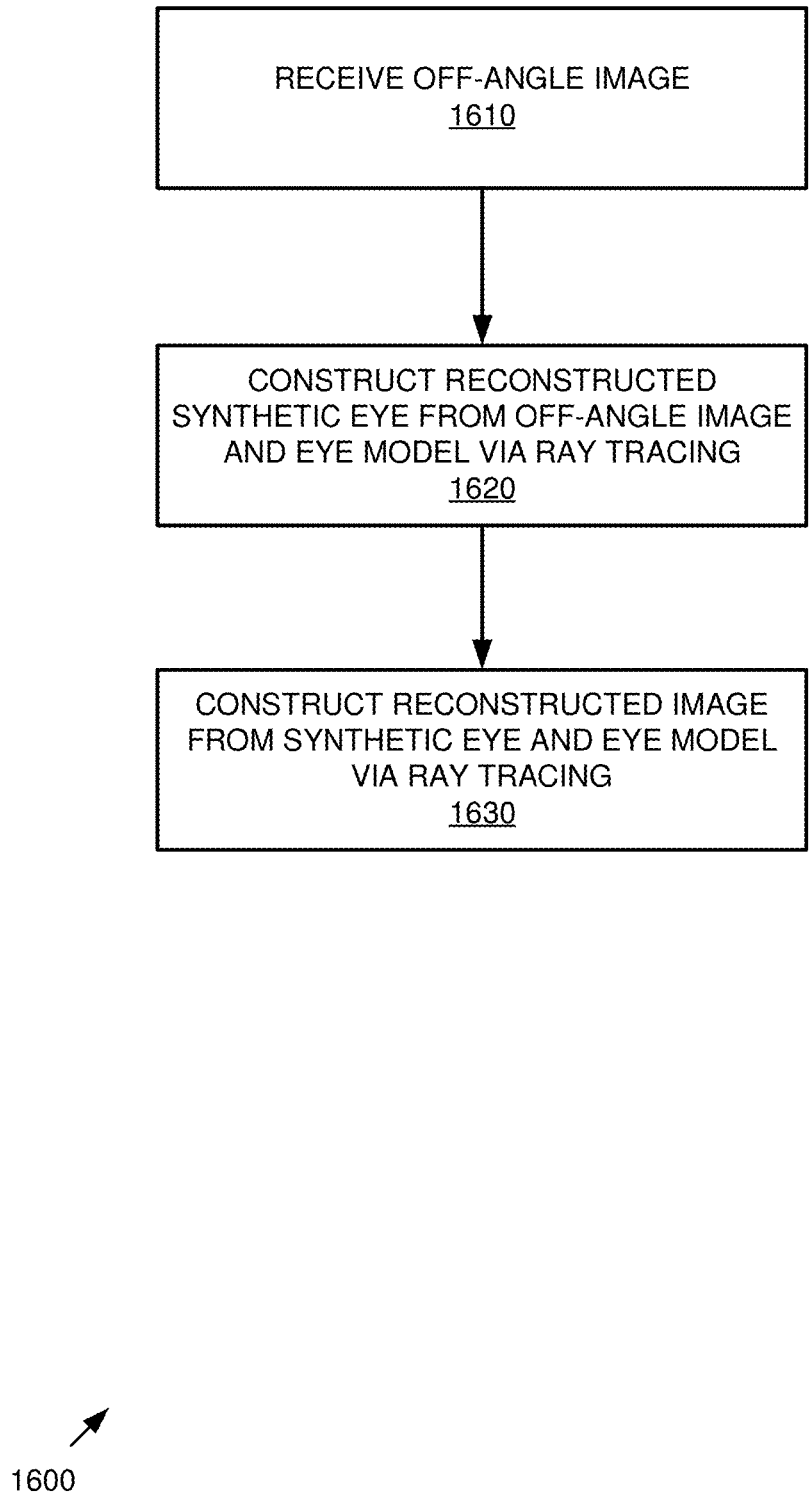
FIG. 16 is a flowchart of an example method of implementing frontal view reconstruction via an eye model.

FIG. 16 is a flowchart of an example method 1600 of implementing frontal view reconstruction via an eye model and can be implemented, for example, via the system shown in FIG. 15.

At 1610, an off-angle image (e.g., depicting an iris) is received.

At 1620, a reconstructed synthetic eye is constructed from an off-angle image and eye model via ray tracing. Ray-tracing techniques can be used to generate a synthetic eye (e.g., the iris) on which additional processing can be performed. Essentially, ray tracing writes the synthetic iris appearance to a representation of a synthetic iris in appropriate locations mimicking a physical manifestation of the iris. Alternatively, a mapping between points can be determined without having actual iris data.

At 1630, a reconstructed image is constructed from the reconstructed synthetic eye and eye model via ray tracing. Again, ray tracing can be used, but a frontal view can be generated. Essentially, the synthetic eye is viewed from the front (e.g., by a synthetic camera).

Example 34—Example Gaze Information

In any of the examples herein, gaze information can be used for a variety of purposes. Such information can include the distance to the eye (e.g., from the camera, whether actual or synthetic), gaze angle combination (e.g., horizontal, vertical, or both) with respect to the optical axis, and the like. Other information, such as focal length, sensor characteristics, and the like can be included in the analysis. In some cases, the information can be determined from an image, or the information may be known, included as metadata, or the like.

To determine gaze angle, eccentricity of the iris or pupil can be used.

Example 35—Example System Constructing Reconstructed Synthetic Eye

Figure 17:
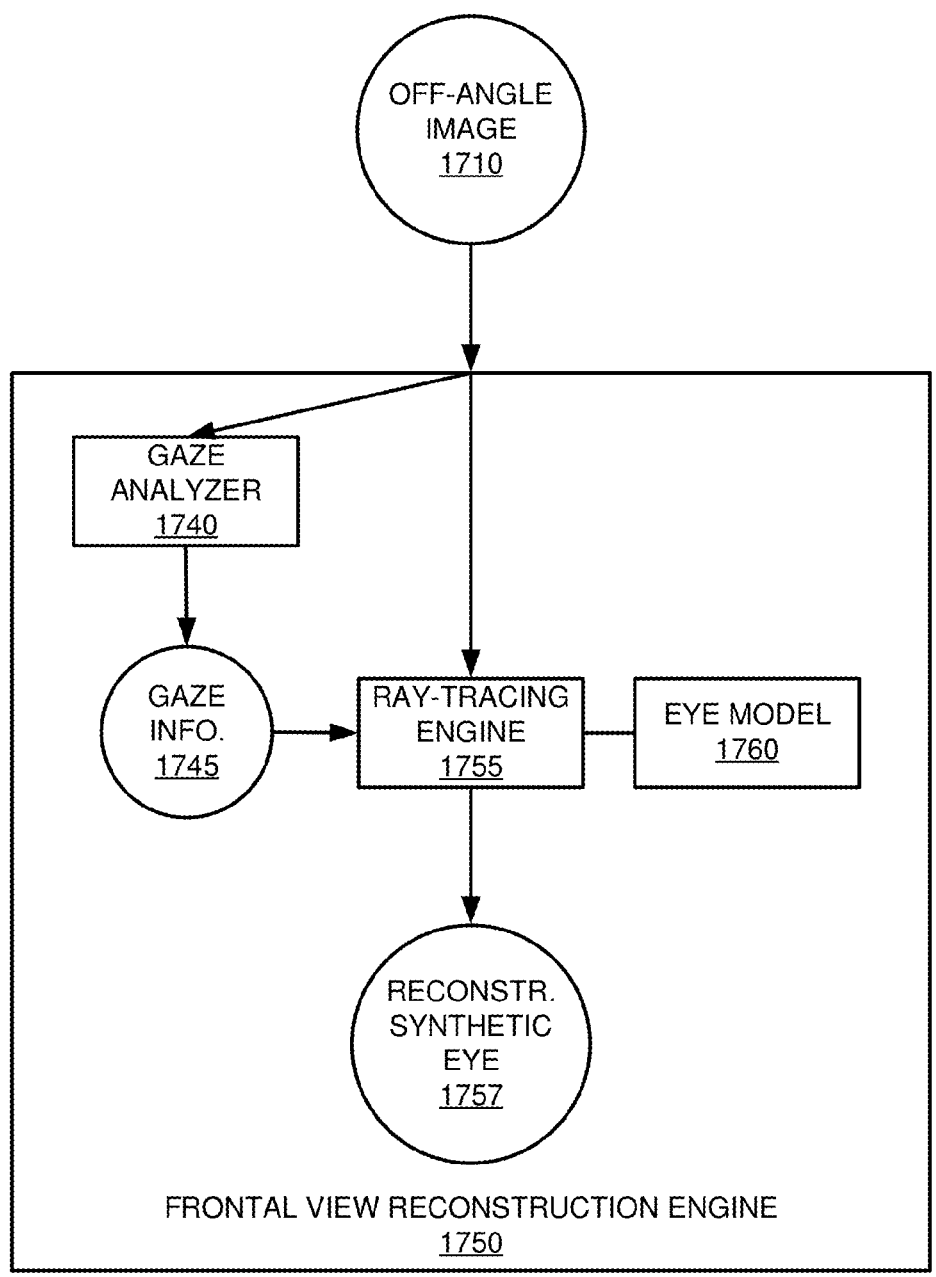
FIG. 17 is a block diagram of an example system constructing a reconstructed synthetic eye from an off-angle image.

FIG. 17 is a block diagram of an example system 1700 constructing a reconstructed synthetic eye from an off-angle image. The system 1700 operates to generate a synthetic eye 1757 that can be used in conjunction with other systems to provide a complete solution to frontal view reconstruction.

In the example, the frontal view reconstruction engine 1750 receives an off-angle image 1710 and generates a synthetic eye 1757 (e.g., iris) via the ray-tracing engine 1755. As described herein, the synthetic eye 1757 can then be used to generate a reconstructed frontal view of the iris depicted in the off-angle image 1710. In practice, the systems can be combined into a single engine.

The ray-tracing engine 1755 can perform ray tracing as described herein with reference to an eye model 1760 and gaze information 1745 as determined by the gaze analyzer 1740 to generate the synthetic eye 1757. Other information can be obtained from other sources.

Example 36—Example Method of Constructing Synthetic Eye

Figure 18:
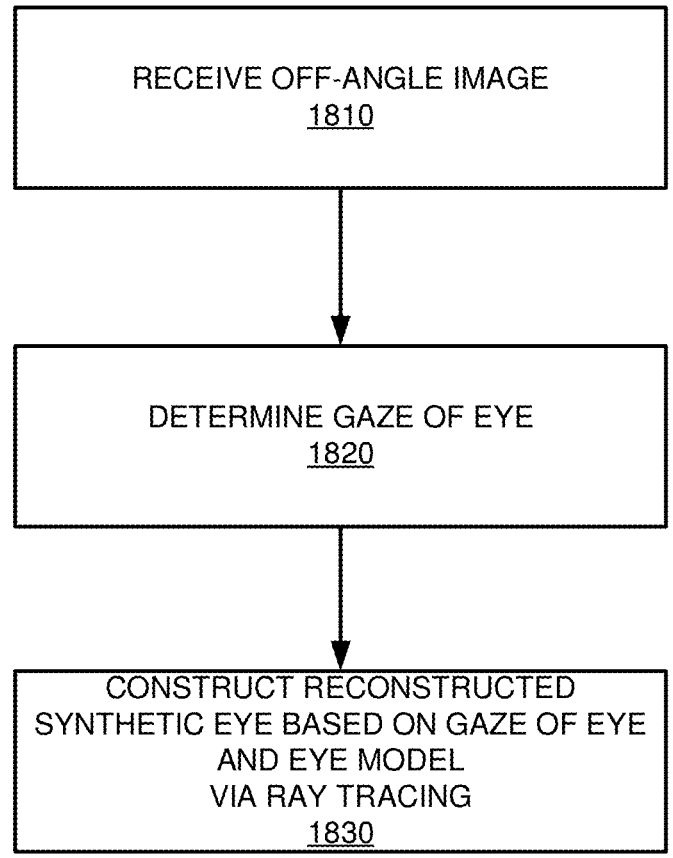
FIG. 18 is a flowchart of an example method of constructing a synthetic eye from an off-angle image.

FIG. 18 is a flowchart of an example method 1800 of constructing a synthetic eye from an off-angle image and can be implemented, for example, in the system shown in FIG. 17.

At 1810, an off-angle image depicting an iris is received.
At 1820 the gaze of the eye is determined.
At 1830, a reconstructed synthetic eye (e.g., iris) is constructed based on the gaze of the eye and an eye model via ray tracing as described herein.

Example 37—Example System Reconstructing Image from Synthetic Eye

Figure 19:
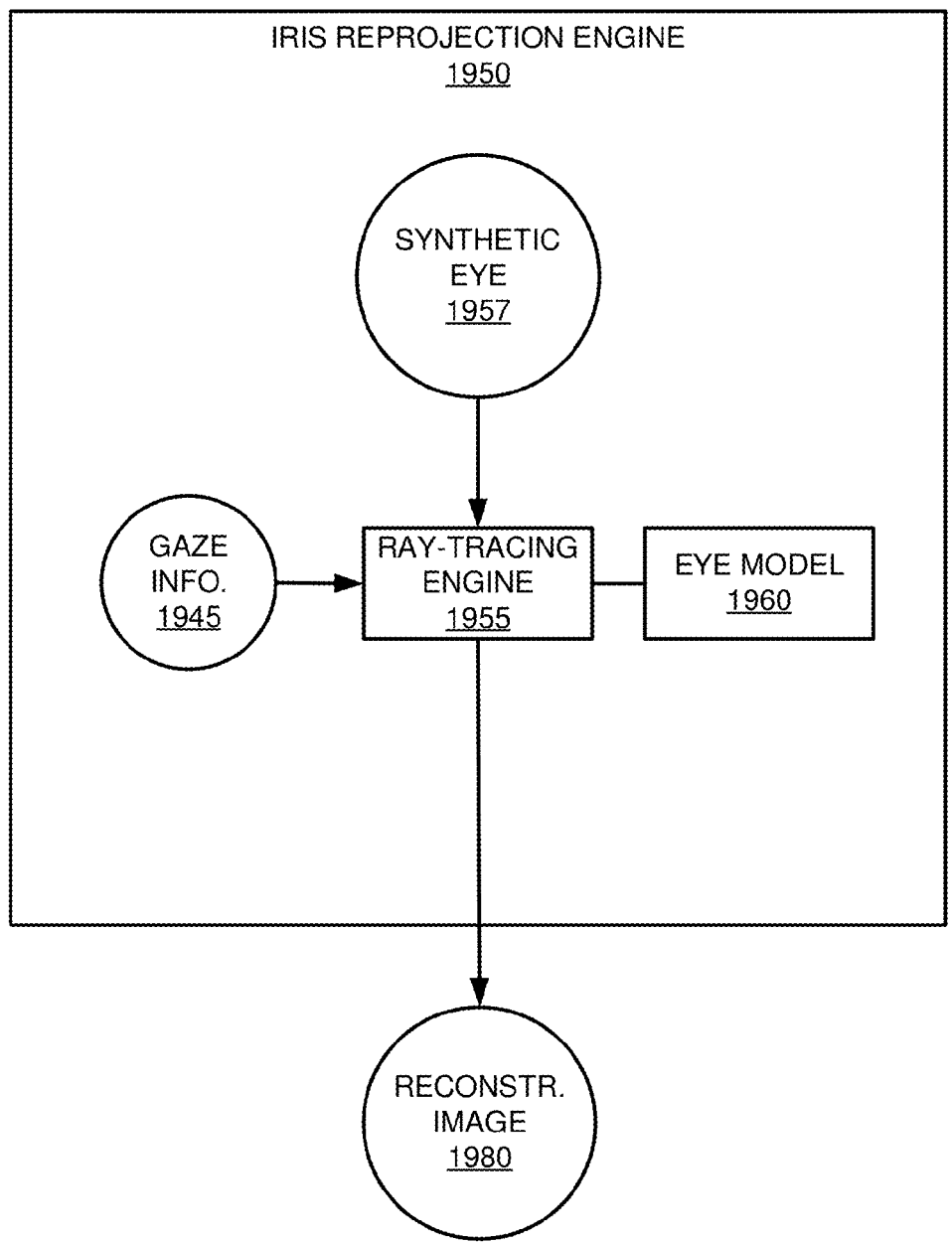
FIG. 19 is a block diagram of an example system reconstructing an image from a synthetic eye.

FIG. 19 is a block diagram of an example system 1900 reconstructing an image from a synthetic eye. In the example, the synthetic eye 1957 (e.g., iris) is received as input by a ray-tracing engine 1955, which is able to output a reconstructed image 1980 from the synthetic eye 1957 and model corneal refraction as described herein.

The eye model 1960 can include information about the cornea, the shape of the eye (e.g., aspherical), and the like. The gaze information 1945 may be simplified because the gaze angle is desired to be 0 for both horizontal and vertical angles. Other information, such as camera location, focal length, sensor size, and the like can be incorporated.

Due to the limbus effect, some information that is available in the synthetic iris may be occluded by the limbus in a frontal view. If so, it is not depicted in the reconstructed image 1980.

Also as described herein, some information may not have been available (e.g., portions of the iris are unviewable) in the off-angle image due to limbus occlusion, so the reconstructed frontal image 1980 may be missing such information. The information can be designated as to be masked when performing recognition.

Example 38—Example Method of Reconstructing Image from Synthetic Eye

An example method reconstructing a frontal image from a synthetic eye can be implemented, for example, in the system shown in FIG. 10.

A synthetic eye (e.g., iris) is received. The synthetic eye can represent the texture of the iris in two-dimensional or three-dimensional space.

A re-projected image of the iris is constructed based on a frontal gaze and the eye model via ray tracing as described herein.

The reconstructed image is output. The image can then be used for image recognition purposes or to construct a precomputed transform as described herein.

Example 39—Example Ray Tracing

FIG. 20 is a block diagram showing a ray trace model for reconstructing a frontal view. As described herein, the model can be used to construct a synthetic eye and then reconstruct a frontal view via the synthetic eye.

Example 40—Example Limbus Effects

Figure 21:
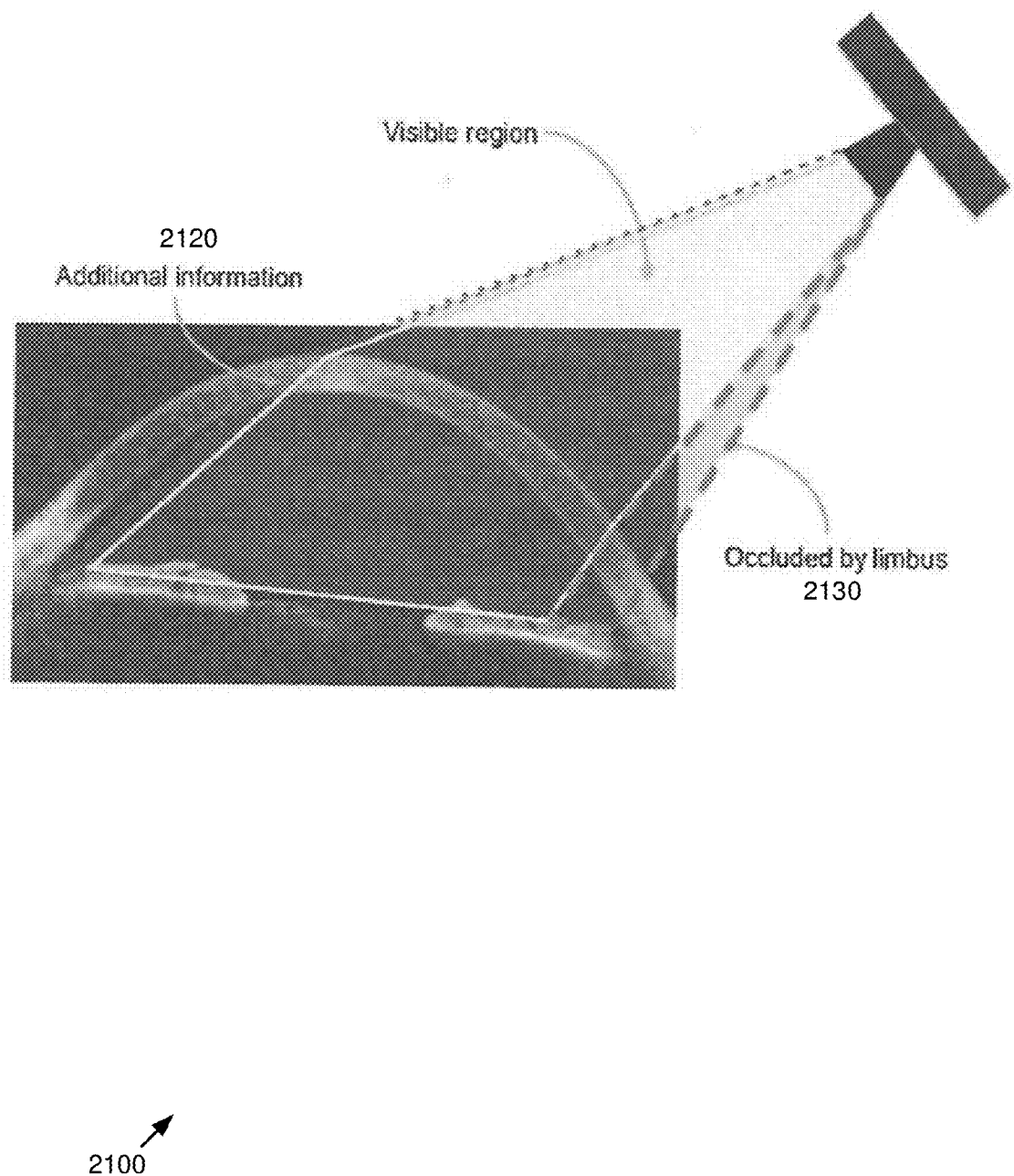
FIG. 21 is a block diagram showing effects of the limbus.

FIG. 21 is a block diagram showing effects of the limbus. The iris visible region changes with gaze. Because of the off-angle gaze, some portions of the limbus (e.g., corresponding to additional image information 2120) are visible in the off-angle gaze that would not be visible in a frontal view. As described herein, such information is discarded (e.g., not included) when reconstructing the frontal view.

Similarly, because of the off-angle gaze, some portions of the limbus 2130 that would be visible in a frontal view are occluded. Such information can be masked from consideration (e.g., in the probe and the gallery image) to prevent it from disrupting the recognition process.

Example 41—Example Limbus Effects on Reconstructed Frontal Image

Figure 22:
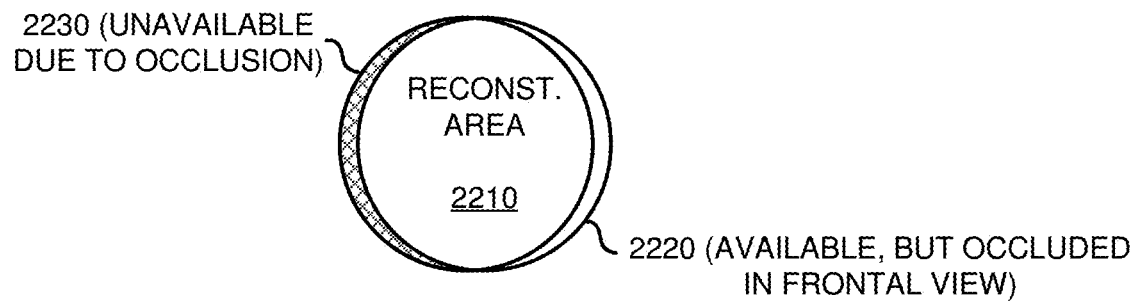
FIG. 22 is a block diagram showing effect of the limbus on a reconstructed frontal image.

FIG. 22 is a block diagram showing effect of the limbus on a reconstructed frontal image of an iris. The image is not to scale. A physical location of the limbus (e.g., within the eye) can be modeled during the reconstruction process to determine the effect of the limbus on the reconstructed frontal image.

As a result, in any of the examples herein, reconstructing the frontal view 2210 can comprise removing a portion 2220 of the off-angle iris image occluded by the limbus due to the frontal view being viewed frontally.

As another result, in any of the examples herein, when reconstructing a frontal view, a portion of the frontal view of the iris can be masked from consideration during iris recognition (e.g., due to limbus occlusion). The limbus occlusion causes certain portions of the iris 2230 to be unavailable for reconstruction. Accordingly, the portions of the iris that were occluded by the limbus in the off-angle iris image (e.g., as indicated by the eye model) can be so masked. Because such information is not available for reconstruction, masking it from consideration during iris recognition can result in better recognition performance Masking can prevent the portion of the gallery image that corresponds to the missing portion of the probe image from being considered, which would otherwise result in mismatch of the image portion that is being masked.

Also, when segmentation is performed on the iris, such segmentation can be based on modeled occlusion by the limbus, resulting in more accurate segmentation. Thus, iris and non-iris image data can be properly separated. Subsequently, when the image of the iris is unwrapped, the improved segmentation can result in superior unwrapped image results, which are ultimately submitted for recognition by iris recognition logic.

Example 42—Example Masking of Image

As described herein, when a frontal view is reconstructed, some information (e.g., portions of the iris) may be not be available because some portions of the iris may not have been viewable due to the gaze angle and occlusion by the limbus. In such a case, the areas of the image can be masked from consideration during the recognition process.

A recognizer may accept parameters (e.g., via an API or other mechanism) to indicate which portions of the image are not to be considered during recognition. Consequently, the masked portions can be disregarded during recognition (e.g., comparison with gallery images).

Example 43—Example Ray-Tracing Implementation: Limbus Effect

Figure 23A:
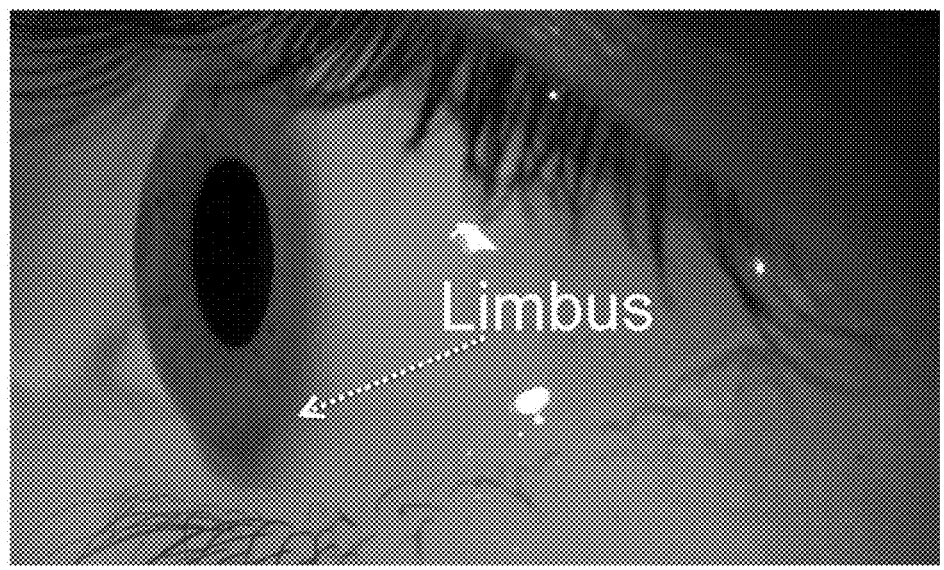
FIGS. 23A-B are illustrations of the limbus.
Figure 23B:
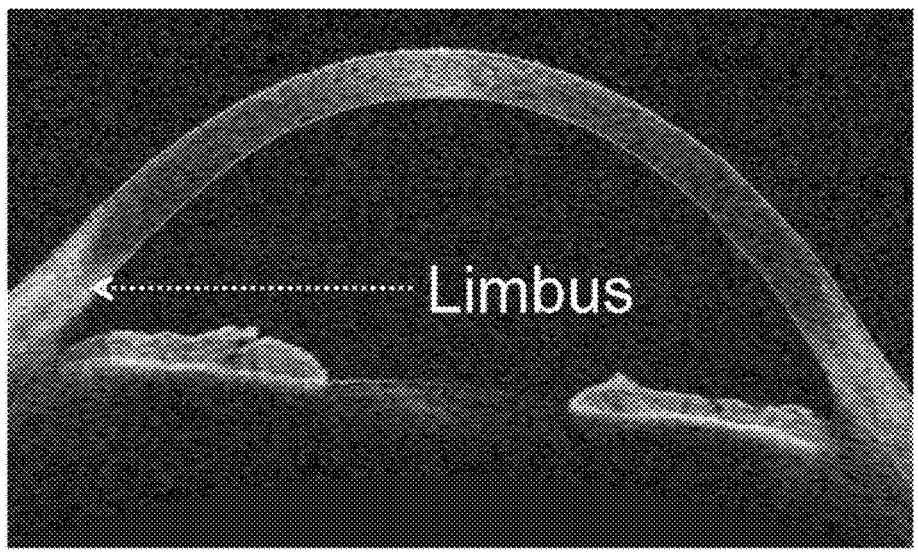

Accurate off-axis iris recognition requires understanding the role of the limbus effect. As shown in FIGS. 23A-B, the limbus is a semi-transparent member of the eye that changes from opaque at the boundary with the sclera to totally transparent at the boundary with the cornea. An assessment of Optical Coherence Tomography (OCT) images, as shown in FIG. 23B, indicates that the limbus significantly occludes regions of the iris for off-axis images beyond 25°. The phenomena can be called the 'limbus effect'.

The entire iris is never truly visible because at any angle, even frontal, some of the iris is occluded by the limbus. When viewing the iris from the same angle, such as frontal, the same portion of the iris is always visible resulting in no depreciation in iris recognition performance. However, off-angle iris imaging can result in a significant decrease in recognition performance due to what is essentially a segmentation problem.

Figure 24A:
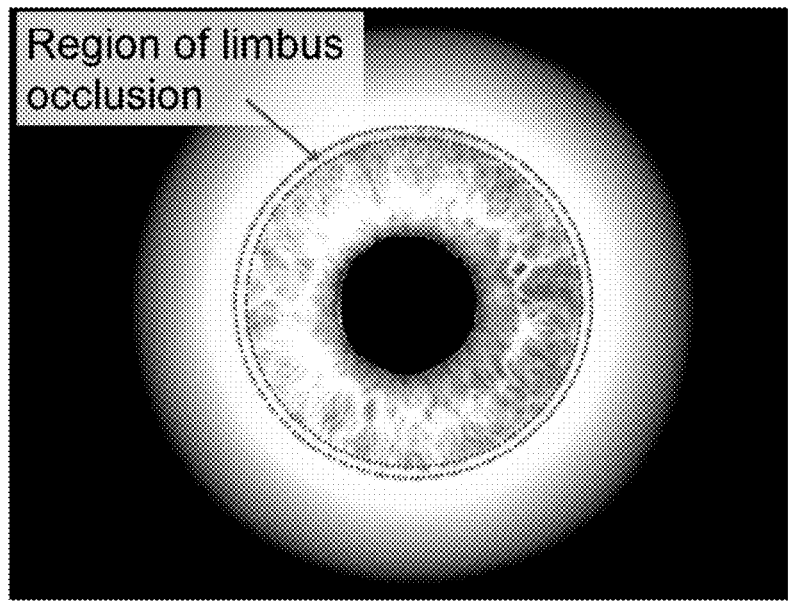
FIG. 24A-C are a rendering of an eye model at 0 degrees and unwrapping results.
Figure 24B:
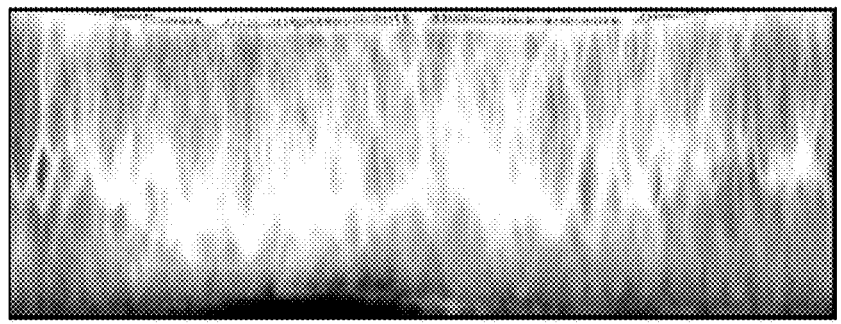
Figure 24C:
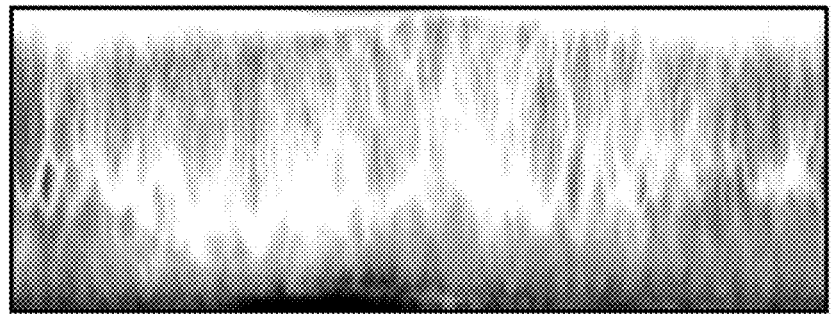

FIG. 24A is a rendering of an example at 0 degrees. The region between dashed lines is occluded by the limbus. Unwrapping results for the eye in FIG. 24A are shown in FIG. 24B overlooking the limbus effect, and FIG. 24C takes the limbus effect into account.

Conventional iris segmentation practices assume that the iris is not occluded by the limbus. Therefore, such solutions incorrectly assume that the iris starts at the fuzzy boundary shared by the cornea and limbus. The incorrect segmentation will produce an unwrapped iris with some regions of the texture stretched (See FIG. 24B). On the other hand, when the limbus effect is taken into account, the unwrapped iris is at the correct scale (See FIG. 24C), the occluded areas can be removed from the iris code, and a similarity can be better estimated. The limbus effect causes a significant portion of the degradation of traditional off-axis iris recognition performance.

Example 44—Example Embodiment

An example embodiment can be a system comprising one or more hardware processing units; non-transitory computer-readable memory coupled to the one or more hardware processing units; and a fully focused iris image stitching engine, wherein the fully focused iris image stitching engine is configured to accept a plurality of reconstructed images at different synthetic focus depths of an iris with an off-angle gaze and output a fully focused image of the iris, wherein the fully focused iris image stitching engine stitches together different in-focus regions of the iris from the plurality of reconstructed images.

Example 45—Example Applications

The technologies herein can be applied to any of a wide variety of applications in which iris recognition can be used, including access to a secure facility or checkpoint, access to the home, access to personal information, identification of a person of interest, helping law enforcement identify individuals, identify clients to offer products, and the like.

Example 46—Example Computing Systems

Figure 25:
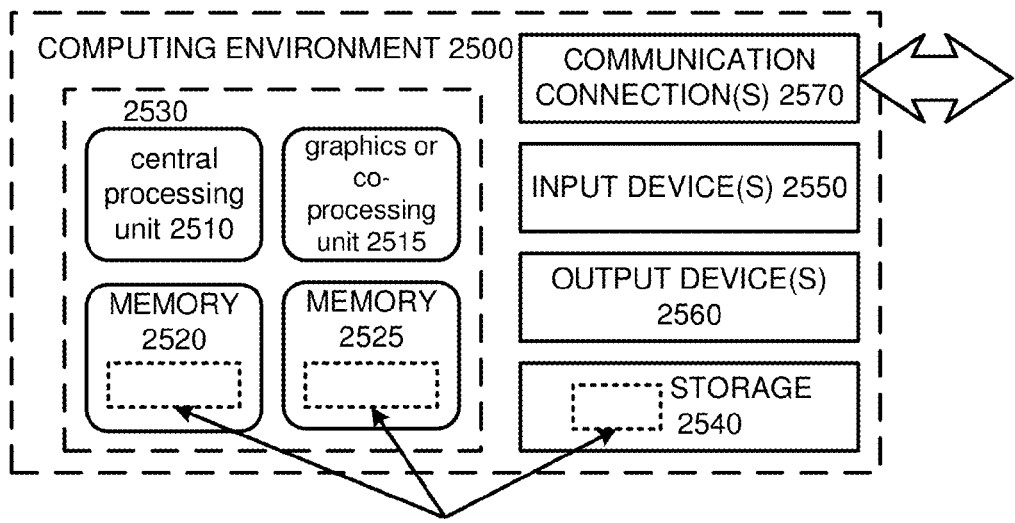
FIG. 25 is a diagram of an example computing system in which described embodiments can be implemented.
Figure 26:
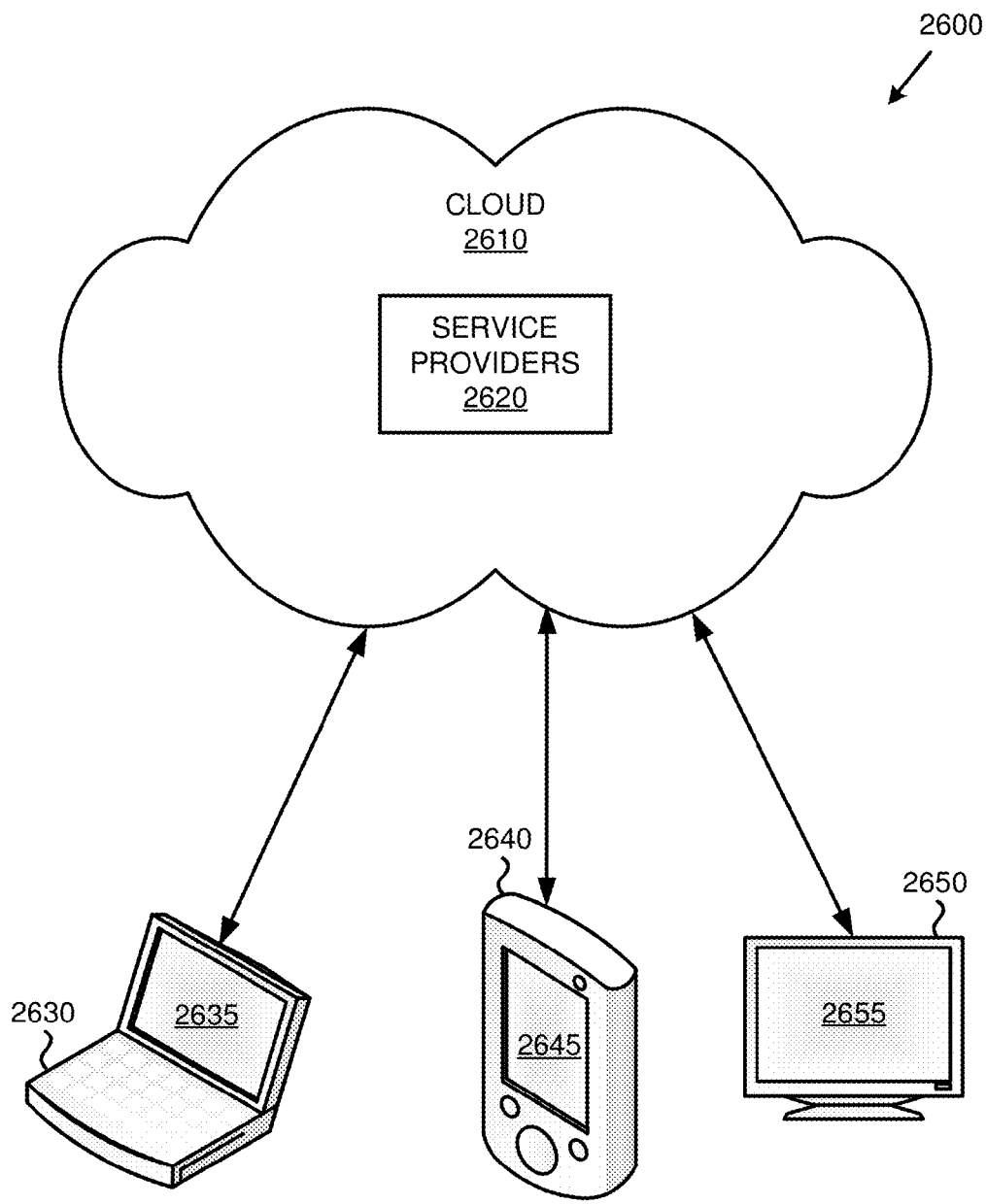
FIG. 26 is an example cloud-support environment that can be used in conjunction with the technologies described herein.

FIG. 25 illustrates a generalized example of a suitable computing system 2500 in which several of the described innovations may be implemented. The computing system 2500 is not intended to suggest any limitation as to scope of use or functionality, as the innovations may be implemented in diverse general-purpose or special-purpose computing systems.

The technologies can also be implemented in specialized hardware (e.g., an iris-recognition appliance) that can contain additional elements (e.g., a high definition camera or the like).

With reference to FIG. 25, the computing system 2500 includes one or more processing units 2510, 2515 and memory 2520, 2525. In FIG. 25, this basic configuration 2530 is included within a dashed line. The processing units 2510, 2515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 25 shows a central processing unit 2510 as well as a graphics processing unit or co-processing unit 2515. The tangible memory 2520, 2525 may be volatile memory (e.g., registers, cache, RAM), non-volatile memory (e.g., ROM, EEPROM, flash memory, etc.), or some combination of the two, accessible by the processing unit(s). The memory 2520, 2525 stores software 2580 implementing one or more innovations described herein, in the form of computer-executable instructions suitable for execution by the processing unit(s).

A computing system may have additional features. For example, the computing system 2500 includes storage 2540, one or more input devices 2550, one or more output devices 2560, and one or more communication connections 2570. An interconnection mechanism (not shown) such as a bus, controller, or network interconnects the components of the computing system 2500. Typically, operating system software (not shown) provides an operating environment for other software executing in the computing system 2500, and coordinates activities of the components of the computing system 2500.

The tangible storage 2540 may be removable or non-removable, and includes magnetic disks, magnetic tapes or cassettes, CD-ROMs, DVDs, or any other medium which can be used to store information in a non-transitory way and which can be accessed within the computing system 2500. The storage 2540 stores instructions for the software 2580 implementing one or more innovations described herein.

The input device(s) 2550 may be a touch input device such as a keyboard, mouse, pen, or trackball, a voice input device, a scanning device, or another device that provides input to the computing system 2500. For video encoding, the input device(s) 2550 may be a camera, video card, TV tuner card, or similar device that accepts video input in analog or digital form, or a CD-ROM or CD-RW that reads video samples into the computing system 2500. The output device(s) 2560 may be a display, printer, speaker, CD-writer, or another device that provides output from the computing system 2500.

The communication connection(s) 2570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 47—Example Cloud-Supported Environment

In example environment 2600, the cloud 2610 provides services for connected devices 2630, 2640, 2650 with a variety of screen capabilities. Connected device 2630 represents a device with a computer screen 2635 (e.g., a mid-size screen). For example, connected device 2630 could be a personal computer such as desktop computer, laptop, notebook, netbook, or the like. Connected device 2640 represents a device with a mobile device screen 2645 (e.g., a small-size screen). For example, connected device 2640 could be a mobile phone, smart phone, personal digital assistant, tablet computer, and the like. Connected device 2650 represents a device with a large screen 2655. For example, connected device 2650 could be a television screen (e.g., a smart television) or another device connected to a television (e.g., a set-top box or gaming console) or the like. One or more of the connected devices 2630, 2640, 2650 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2600. For example, the cloud 2610 can provide services for one or more computers (e.g., server computers) without displays.

Services can be provided by the cloud 2610 through service providers 2620, or through other providers of online services (not depicted). For example, cloud services can be customized to the screen size, display capability, and/or touch screen capability of a particular connected device (e.g., connected devices 2630, 2640, 2650).

In example environment 2600, the cloud 2610 provides the technologies and solutions described herein to the various connected devices 2630, 2640, 2650 using, at least in part, the service providers 2620. For example, the service providers 2620 can provide a centralized solution for various cloud-based services. The service providers 2620 can manage service subscriptions for users and/or devices (e.g., for the connected devices 2630, 2640, 2650 and/or their respective users).

Example 48—Computer-Readable Media

Any of the computer-readable media herein can be non-transitory (e.g., volatile memory such as DRAM or SRAM, nonvolatile memory such as magnetic storage, optical storage, flash memory, solid state drives, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
    receiving a plenoptic iris image depicting an iris;
    from the plenoptic iris image depicting an iris, determining a three-dimensional shape of the iris;
    storing the three-dimensional shape of the iris; and
    applying the three-dimensional shape of the iris as part of iris recognition processing, wherein applying the three-dimensional shape of the iris as part of iris recognition processing comprises:
        constructing a personalized eye model based on the three-dimensional shape of the iris;
        via the personalized eye model, reconstructing a frontal view of an iris depicted in an off-angle iris image; and
        performing iris recognition with the reconstructed frontal view.

2. The method of claim 1 wherein:
    determining a three-dimensional shape of the iris comprises:
    computing a depth map of the plenoptic iris image;
    segmenting the iris as depicted in the plenoptic iris image; and
    registering the segmented iris to the depth map.

3. The method of claim 1 wherein:
    applying the three-dimensional shape of the iris as part of iris recognition processing comprises:
    constructing a personalized eye model based on the three-dimensional shape of the iris; and
    performing iris recognition via the personalized eye model.

4. The method of claim 1 further comprising:
    from the plenoptic iris image, determining a three-dimensional shape of a limbus depicted in the plenoptic iris image;
    storing the three-dimensional shape of the limbus; and
    applying the three-dimensional shape of the limbus during iris recognition processing.

5. The method of claim 4 further comprising:
    performing iris recognition, wherein the iris recognition accounts for the three-dimensional shape of the limbus.

6. A method implemented at least in part by a computing system, the method comprising:
    receiving a plenoptic iris image depicting an iris;
    from the plenoptic iris image depicting an iris, determining a three-dimensional shape of the iris;
    storing the three-dimensional shape of the iris; and
    applying the three-dimensional shape of the iris as part of iris recognition processing;
    wherein the method further comprises:
    from the plenoptic iris image, determining a three-dimensional shape of a limbus depicted in the plenoptic iris image;
    storing the three-dimensional shape of the limbus;
    performing iris recognition, wherein the iris recognition accounts for the three-dimensional shape of the limbus; and
    applying the three-dimensional shape of the limbus during iris recognition processing;
    wherein the plenoptic iris image depicts an iris with an off-angle gaze; and
    wherein the method further comprises:
    based on the three-dimensional shape of the limbus, determining a portion of the iris that is occluded by the limbus in an on-angle gaze; and
    during iris recognition, removing the occluded portion of the iris from consideration.

7. A method implemented at least in part by a computing system, the method comprising:
    receiving a plenoptic iris image depicting an iris;
    from the plenoptic iris image depicting an iris, determining a three-dimensional shape of the iris;
    storing the three-dimensional shape of the iris; and
    applying the three-dimensional shape of the iris as part of iris recognition processing;
    wherein:
    the plenoptic iris image depicts an iris with an off-angle gaze; and wherein the method further comprises:
storing a three-dimensional position of a limbus;
based on the three-dimensional position of the limbus, determining a portion of the iris that is occluded by the limbus in an on-angle gaze; and
during iris recognition, removing the occluded portion of the iris from consideration.

* * * * *